(12) United States Patent
Schwartz

(10) Patent No.: US 9,844,204 B2
(45) Date of Patent: Dec. 19, 2017

(54) POWERED CORRAL SYSTEM

(71) Applicant: RK Industries, LLC, Spivey, KS (US)

(72) Inventor: Wayne D. Schwartz, Spivey, KS (US)

(73) Assignee: RK Industries, LLC, Spivey, KS (US)

( * ) Notice: Subject to any disclaimer, the term of this patent is extended or adjusted under 35 U.S.C. 154(b) by 183 days.

(21) Appl. No.: 14/718,641

(22) Filed: May 21, 2015

(65) Prior Publication Data

US 2015/0334987 A1  Nov. 26, 2015

Related U.S. Application Data

(60) Provisional application No. 62/001,152, filed on May 21, 2014.

(51) Int. Cl.
*A01K 3/00* (2006.01)
*E04H 17/00* (2006.01)
(52) U.S. Cl.
CPC ............... *A01K 3/00* (2013.01); *E04H 17/00* (2013.01)
(58) Field of Classification Search
CPC ........ A01K 3/00; A01K 3/002; A01K 1/0035; A01K 1/0005; A01K 1/0613; A01K 1/0029; E04H 17/18
USPC ....... 119/514, 512, 513, 515, 516, 519, 521, 119/522, 523, 524, 840, 843; 180/221, 180/904
See application file for complete search history.

(56) References Cited

U.S. PATENT DOCUMENTS

| | | | |
|---|---|---|---|
| 2,949,972 A | 8/1960 | Wirkala | |
| 3,150,734 A | 9/1964 | Duggar, Jr. | |
| 3,921,585 A * | 11/1975 | Hall | A01K 3/00 119/512 |
| 4,470,564 A | 9/1984 | Johnson | |
| 4,520,592 A | 6/1985 | Holloway | |
| 4,821,679 A * | 4/1989 | Hackert | A01K 3/00 119/502 |
| 4,883,280 A | 11/1989 | Christian | |
| 4,924,813 A * | 5/1990 | Bixler | A01K 3/00 119/512 |
| 4,960,074 A * | 10/1990 | Wilson | A01K 3/00 119/512 |
| 5,115,763 A * | 5/1992 | Wilson | A01K 3/00 119/512 |
| 5,237,960 A * | 8/1993 | Wilson | A01K 3/00 119/514 |
| 5,381,757 A * | 1/1995 | Putney | A01K 3/00 119/512 |

(Continued)

*Primary Examiner* — Trinh Nguyen
(74) *Attorney, Agent, or Firm* — Hovey Williams LLP

(57) ABSTRACT

A folding corral system is operable to define an enclosed space and to selectively adjust the size of the enclosed space. The folding corral system broadly includes a corral structure, a swingable corral panel, and a powered drive system. The corral structure is operable to be installed adjacent the enclosed space. The corral panel is pivotally supported relative to the corral structure to swing about an upright pivot axis. The corral panel is swingable relative to the corral structure into and out of a deployed condition where the swingable corral panel at least partly defines the enclosed space. The powered drive system is drivingly attached relative to the swingable corral panel. The powered drive system is operable to drive the swingable corral panel into and out of the deployed condition.

13 Claims, 21 Drawing Sheets

(56) References Cited

U.S. PATENT DOCUMENTS

| | | | | |
|---|---|---|---|---|
| 6,067,940 A | * | 5/2000 | Holder | A01K 3/00 |
| | | | | 119/512 |
| 6,477,984 B1 | | 11/2002 | Kleinsasser | |
| 6,729,267 B2 | * | 5/2004 | Campbell | B60P 3/04 |
| | | | | 119/513 |
| 2011/0120384 A1 | * | 5/2011 | Wilson | A01K 3/00 |
| | | | | 119/521 |
| 2011/0180012 A1 | * | 7/2011 | Meyer, Jr. | A01K 1/0017 |
| | | | | 119/512 |
| 2015/0075442 A1 | * | 3/2015 | Wilson | A01K 3/00 |
| | | | | 119/512 |
| 2015/0250136 A1 | * | 9/2015 | Wilson | A01K 3/00 |
| | | | | 119/452 |

\* cited by examiner

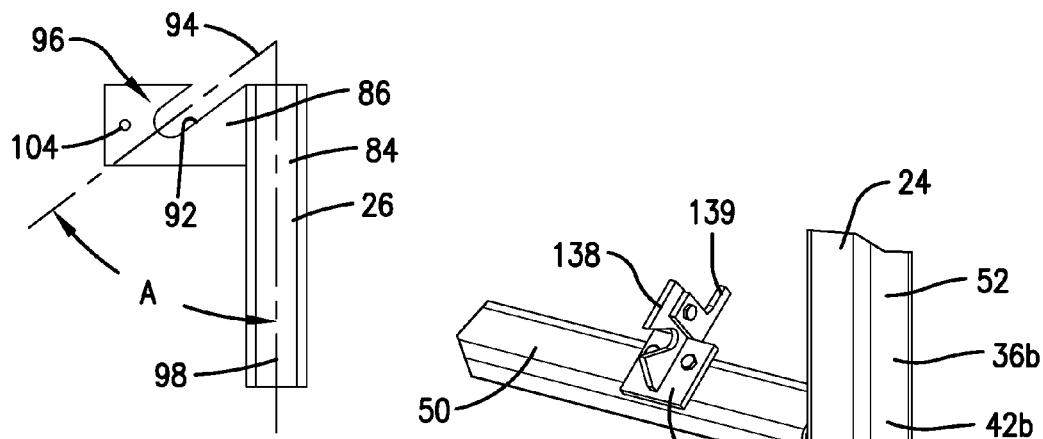
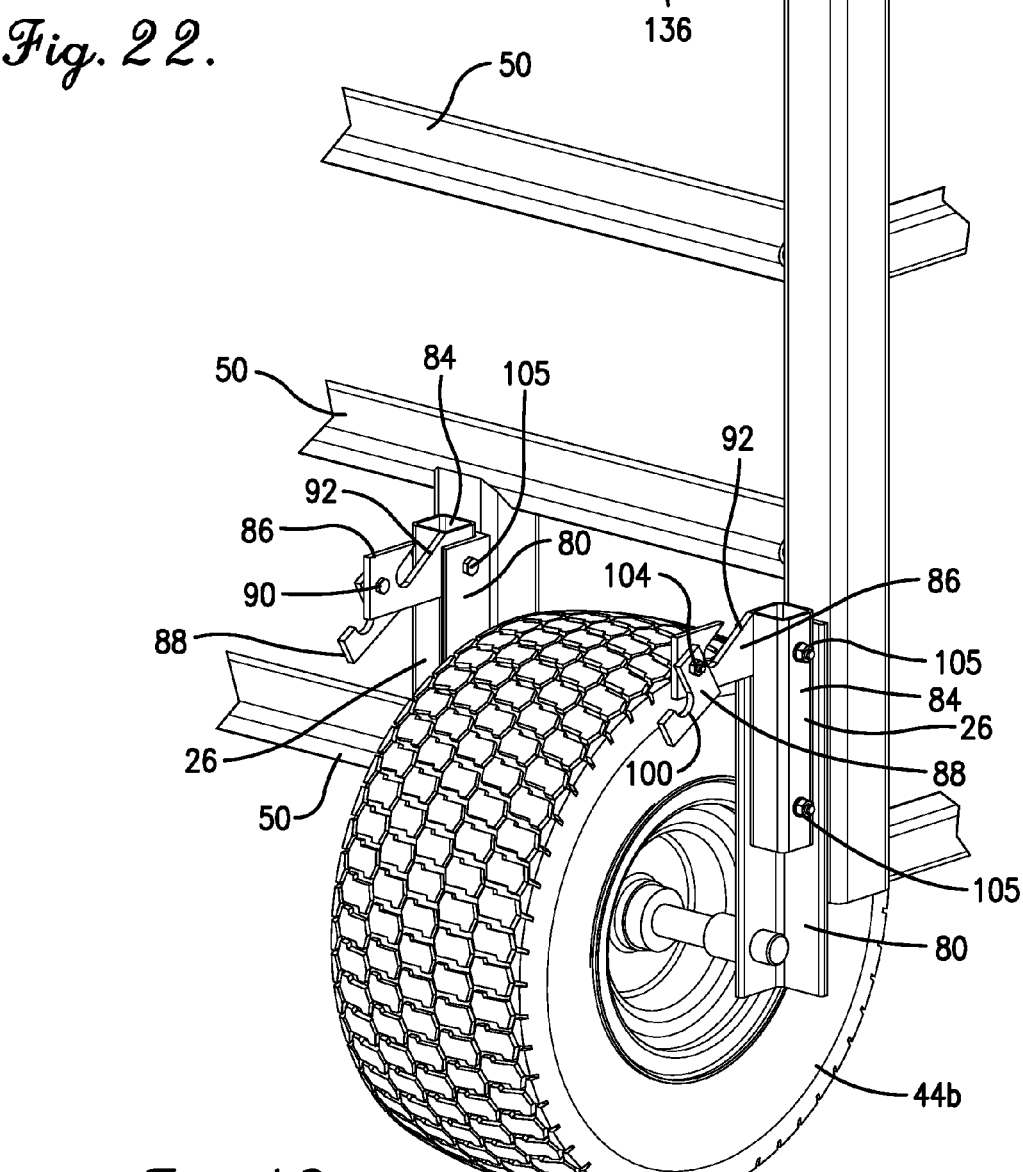

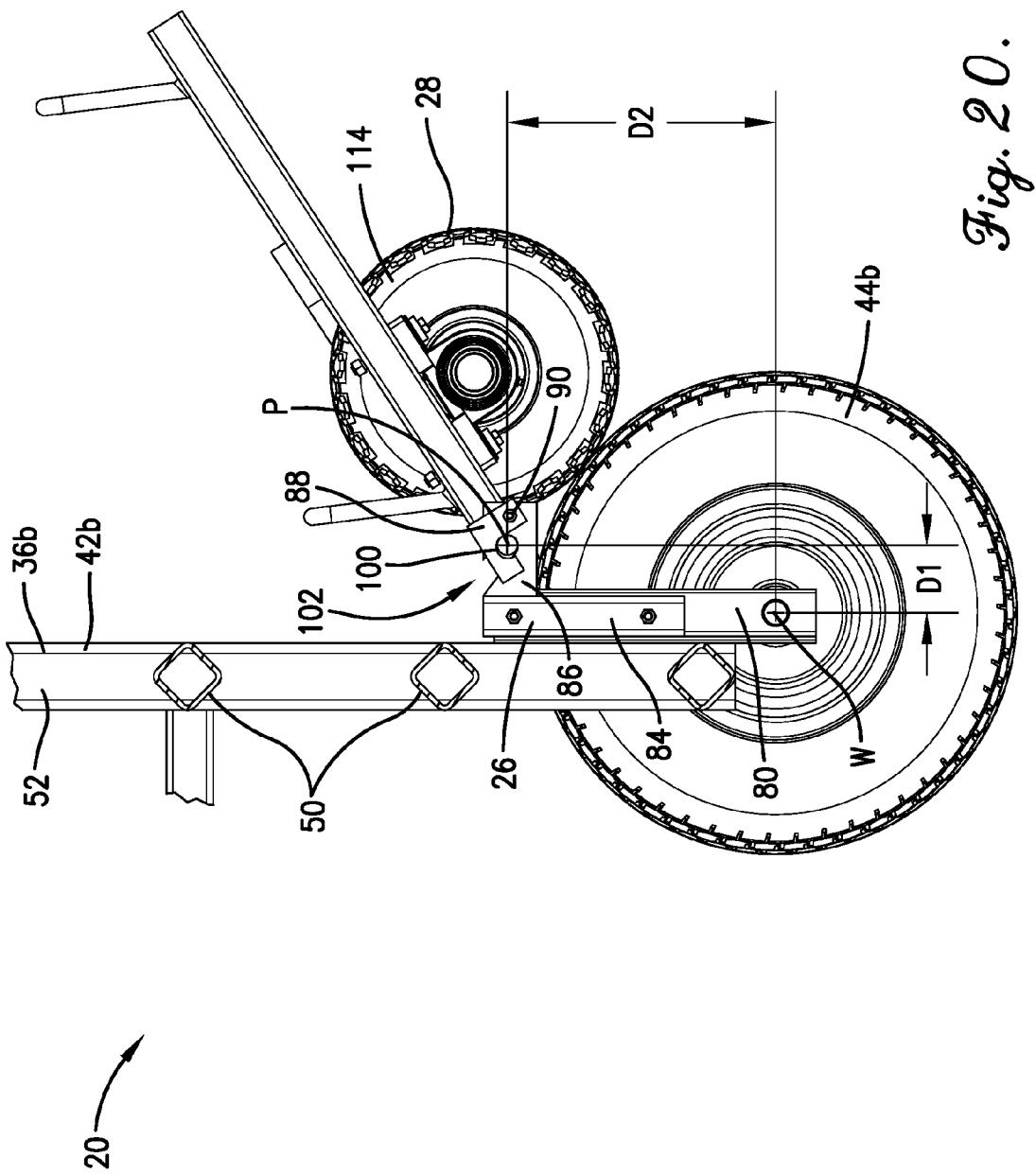

POWERED CORRAL SYSTEM

RELATED APPLICATION

This application claims the benefit of U.S. Provisional Application Ser. No. 62/001,152, filed May 21, 2014, entitled POWERED CORRAL SYSTEM, which is hereby incorporated in its entirety by reference herein.

BACKGROUND

1. Field

The present invention relates generally to livestock handling equipment. More specifically, embodiments of the present invention concern a corral system that can be selectively installed at or removed from a location.

2. Discussion of Prior Art

Corrals have long been used to gather, store, sort, separate, and treat various types of livestock, such as cattle. Prior art corrals typically include one or more pens with gates to permit animal ingress and egress. While some prior art corrals are permanently installed at a location, other corrals can be installed at one location and later moved to another location. In one embodiment of a conventional portable corral system, a plurality of discrete corral panels can be temporarily attached to one another with chain or wire. Other known portable corral systems use multiple panels that are permanently attached to one another and to a rolling chassis.

However, conventional corrals are known to have various deficiencies. For instance, permanent corral installations can only be used at one location to work cattle. While known portable corrals overcome this limitation of permanent corrals, such portable corrals are also problematic. For example, known portable corral systems are notoriously heavy and bulky. The weight and bulk of these systems makes them time consuming to deploy and retrieve. Furthermore, deployment and retrieval of these systems both require the cooperation of several people to lift and otherwise manipulate the corral panels.

SUMMARY

The following brief summary is provided to indicate the nature of the subject matter disclosed herein. While certain aspects of the present invention are described below, the summary is not intended to limit the scope of the present invention.

Embodiments of the present invention provide a corral system that does not suffer from the problems and limitations of the prior art corrals set forth above.

A first aspect of the present invention concerns a folding corral system operable to define an enclosed space and to selectively adjust the size of the enclosed space. The folding corral system broadly includes a corral structure, a swingable corral panel, and a powered drive system. The corral structure is operable to be installed adjacent the enclosed space. The corral panel is pivotally supported relative to the corral structure to swing about an upright pivot axis. The corral panel is swingable relative to the corral structure into and out of a deployed condition where the swingable corral panel at least partly defines the enclosed space. The powered drive system is drivingly attached relative to the swingable corral panel. The powered drive system is operable to drive the swingable corral panel into and out of the deployed condition.

A second aspect of the present invention concerns a corral panel drive assembly operable to be mounted on a wheeled corral panel to drive a wheel of the corral panel. The corral panel drive assembly broadly includes a mounting structure and a powered drive system. The mounting structure is configured to be fastened to the corral panel adjacent the wheel. The powered drive system includes a motor and a rotating driven shaft powered by the motor. The motor is shiftably attached relative to the mounting structure so that the mounting structure at least partly supports the motor. The rotating driven shaft is operable to drive the wheel of the corral panel when powered by the motor.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 1:
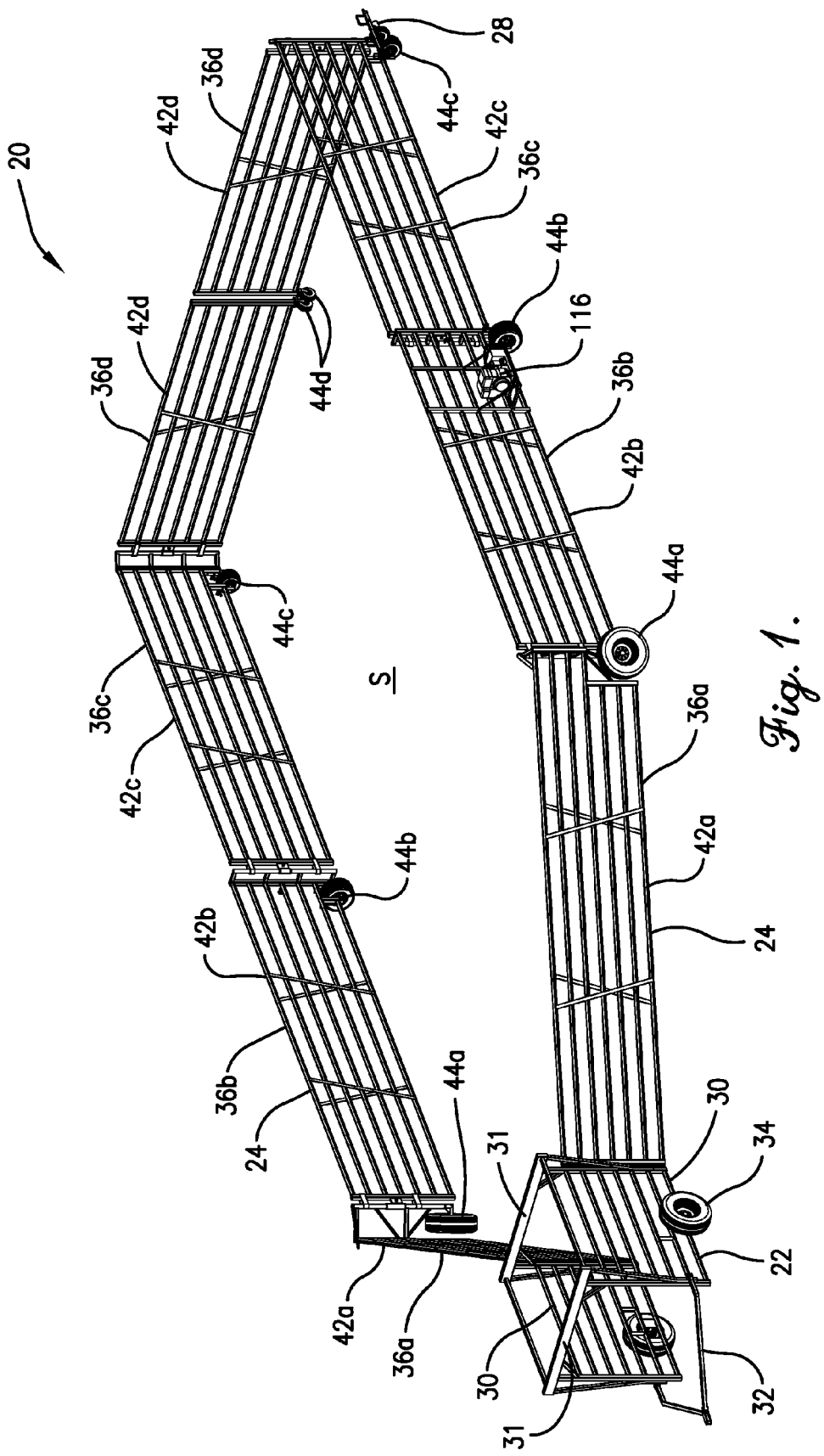
FIG. 1 is a perspective of a corral system constructed in accordance with a preferred embodiment of the present invention, with the corral system including a panel support chassis, corral panel assemblies, bracket assemblies, and a drive system, and with the corral system being in a deployed condition where corral panels of the corral panel assemblies cooperatively enclose a space.
Figure 2:
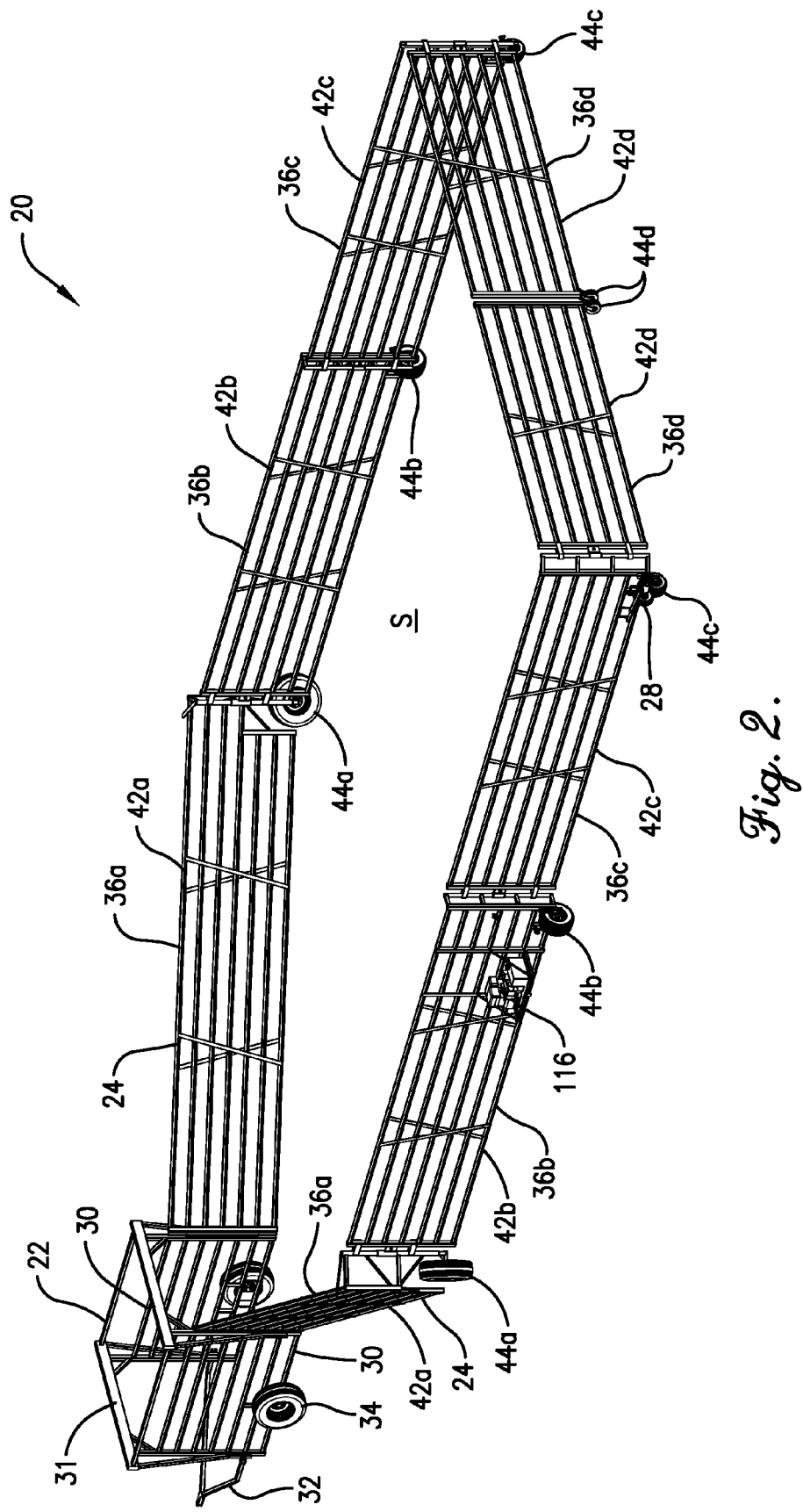
FIG. 2 is a perspective of the corral system similar to FIG. 1, but viewed from a different angle.
Figure 3:
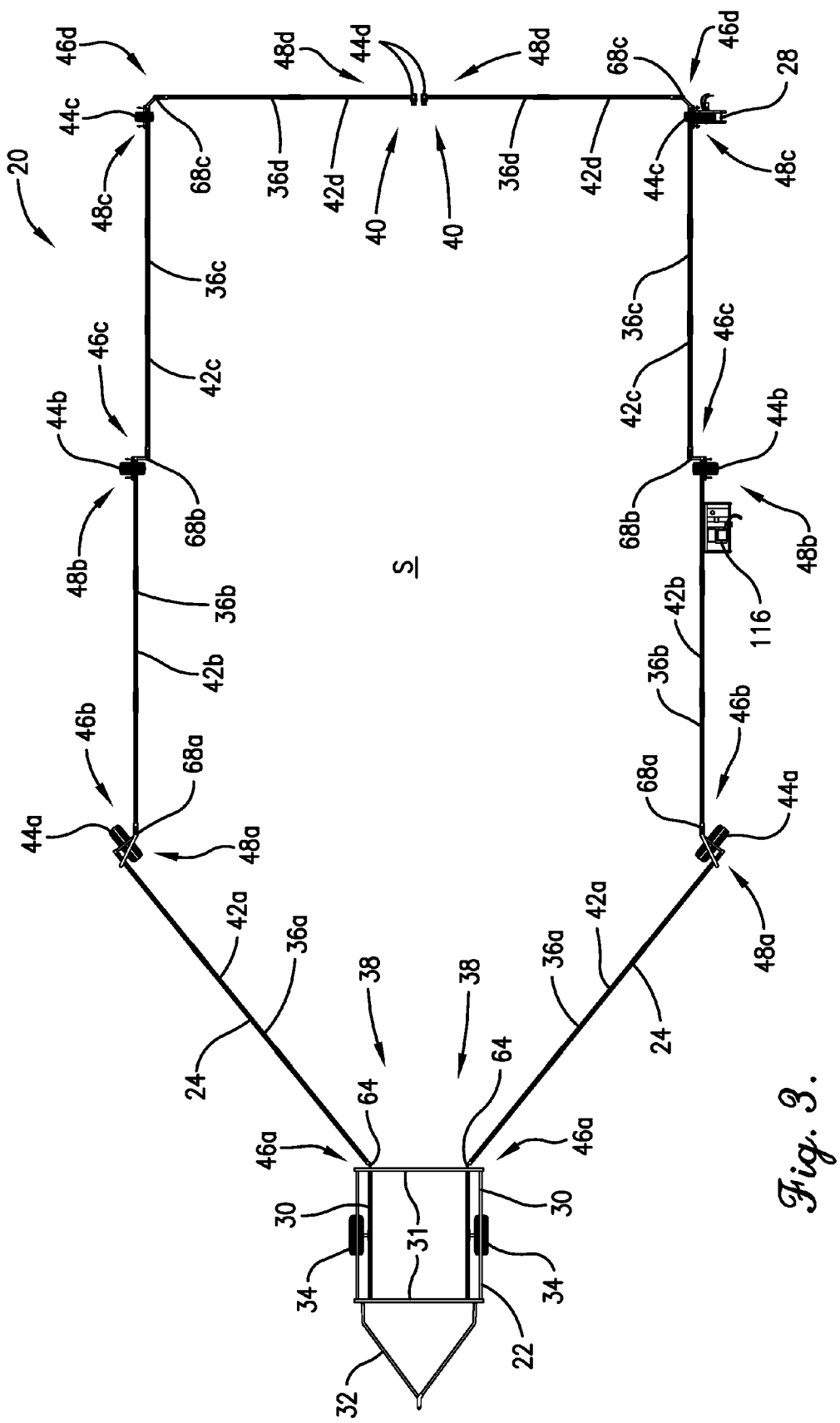
FIG. 3 is a top view of the corral system shown in FIGS. 1 and 2, showing corral panels of the corral panel assemblies pivotally attached in series with one another, with each corral panel assembly including four corral panels.
Figure 4:
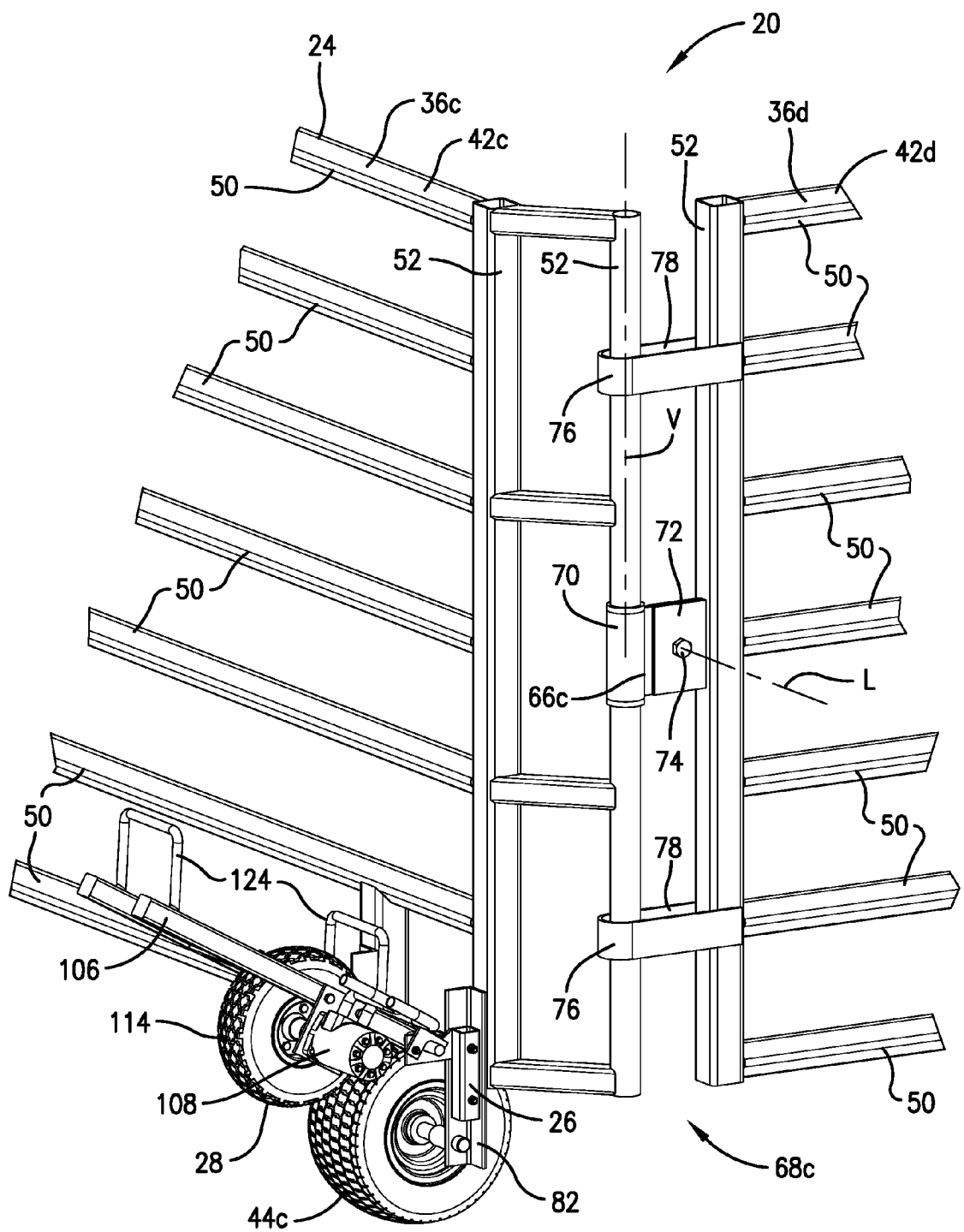
Figure 5:
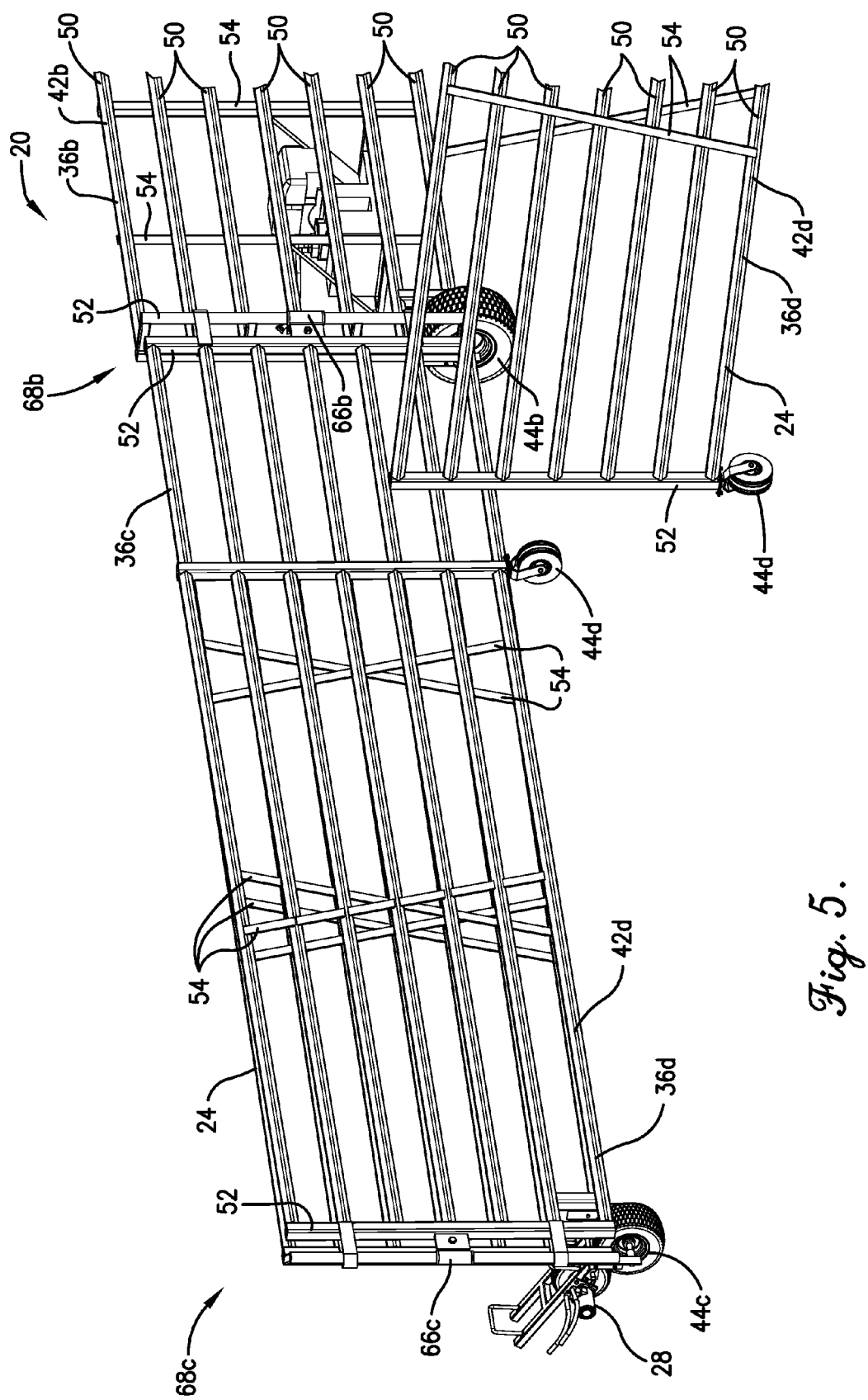
Figure 6:
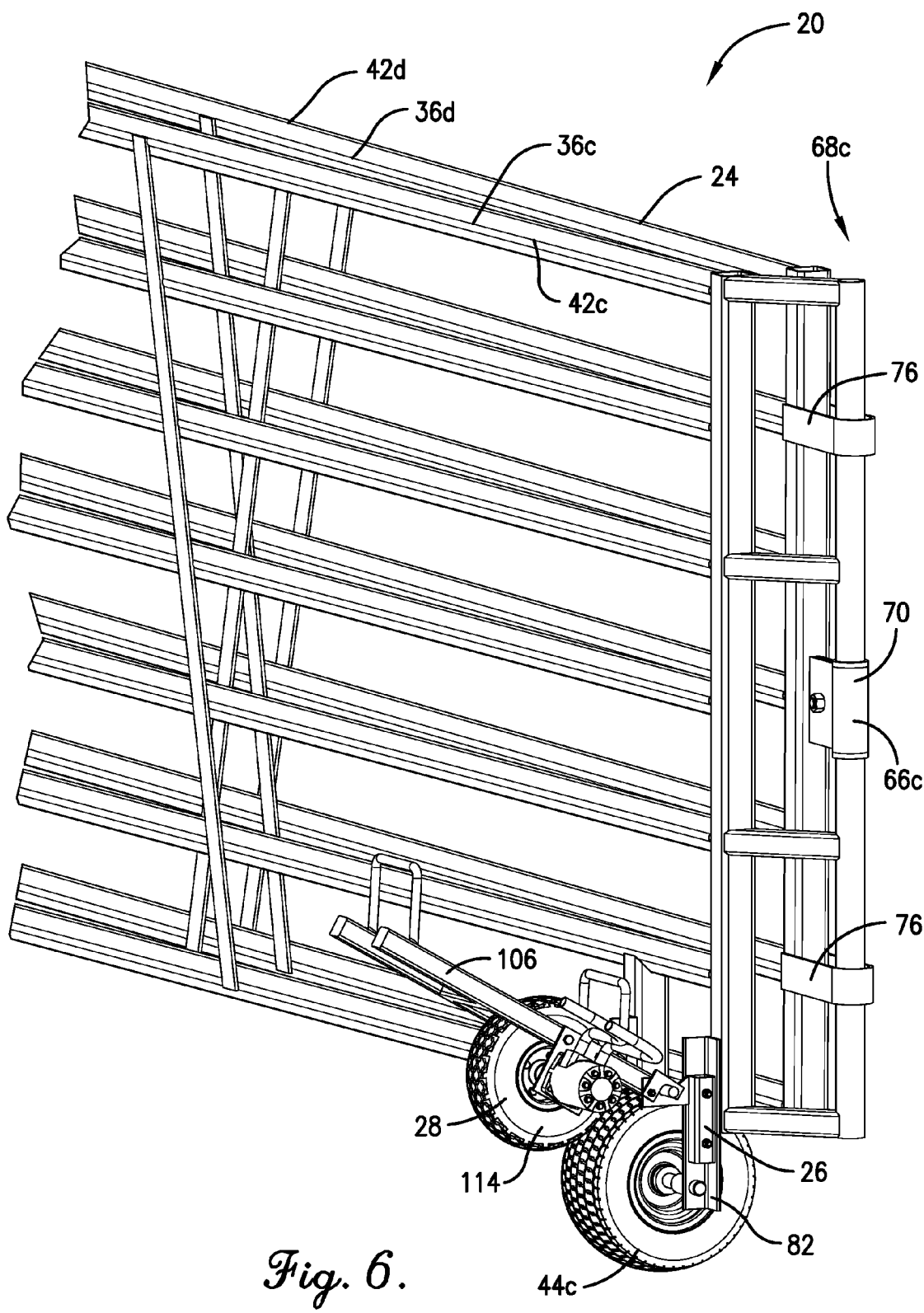
Figure 7:
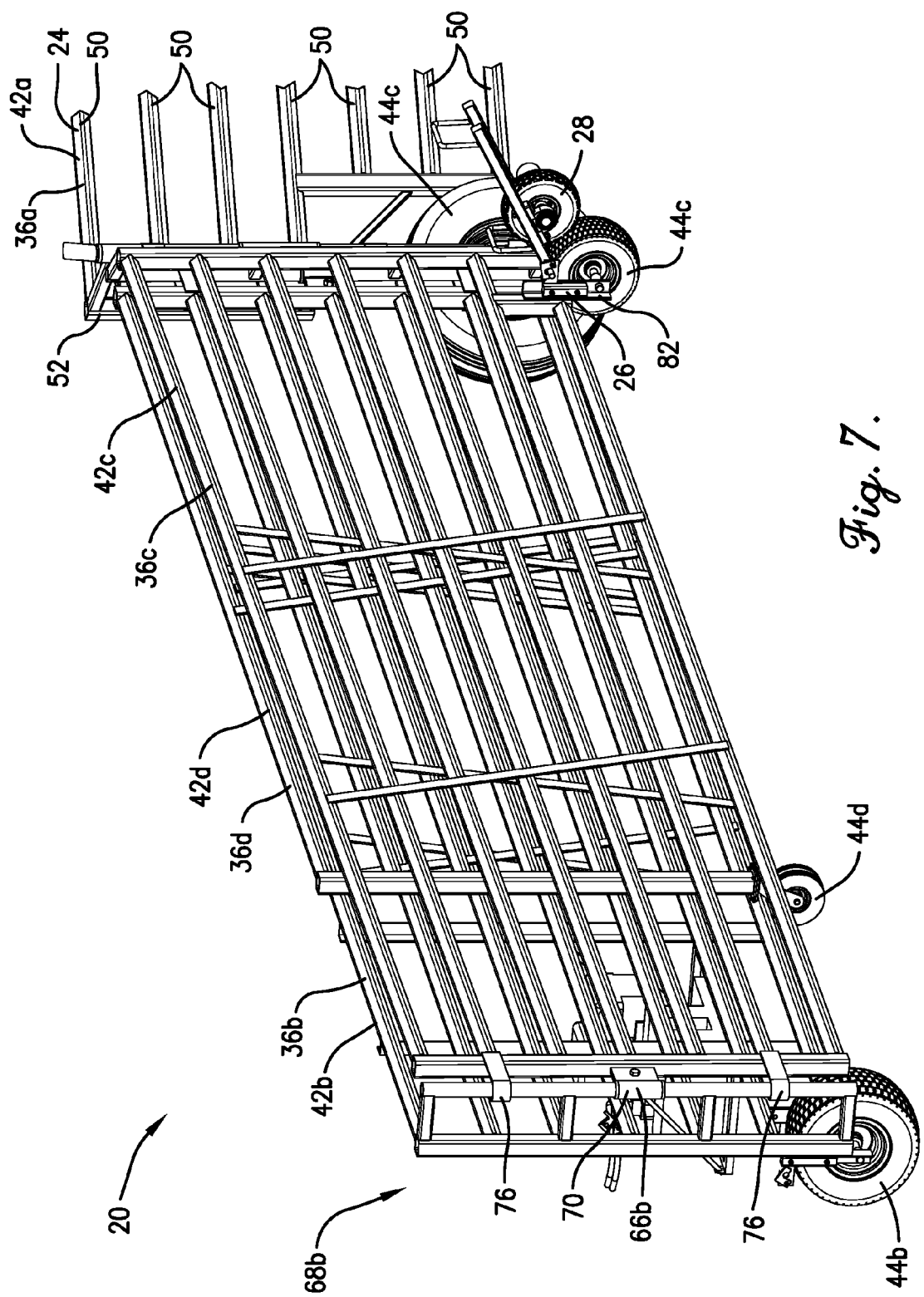
Figure 8:
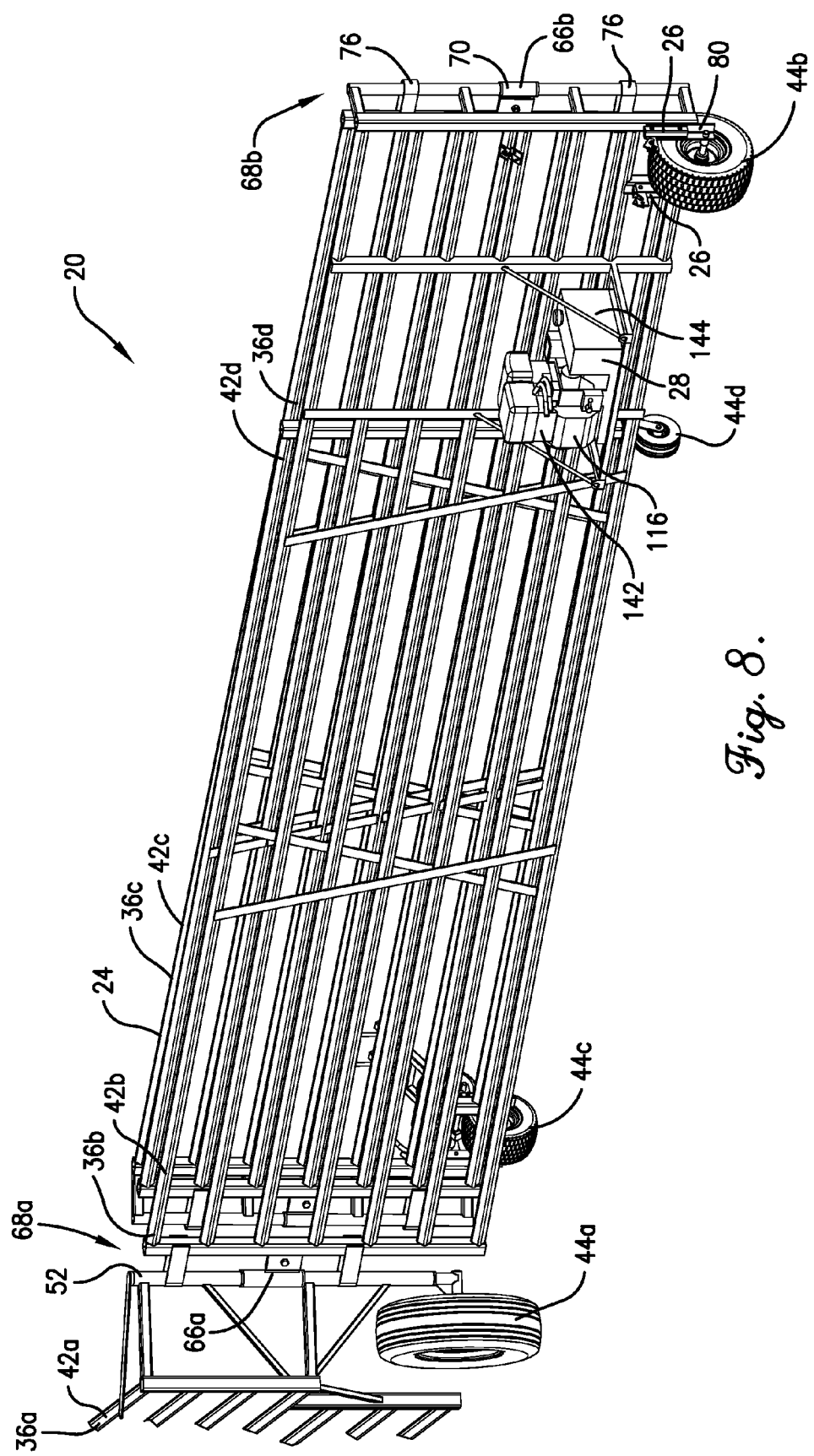
Figure 9:
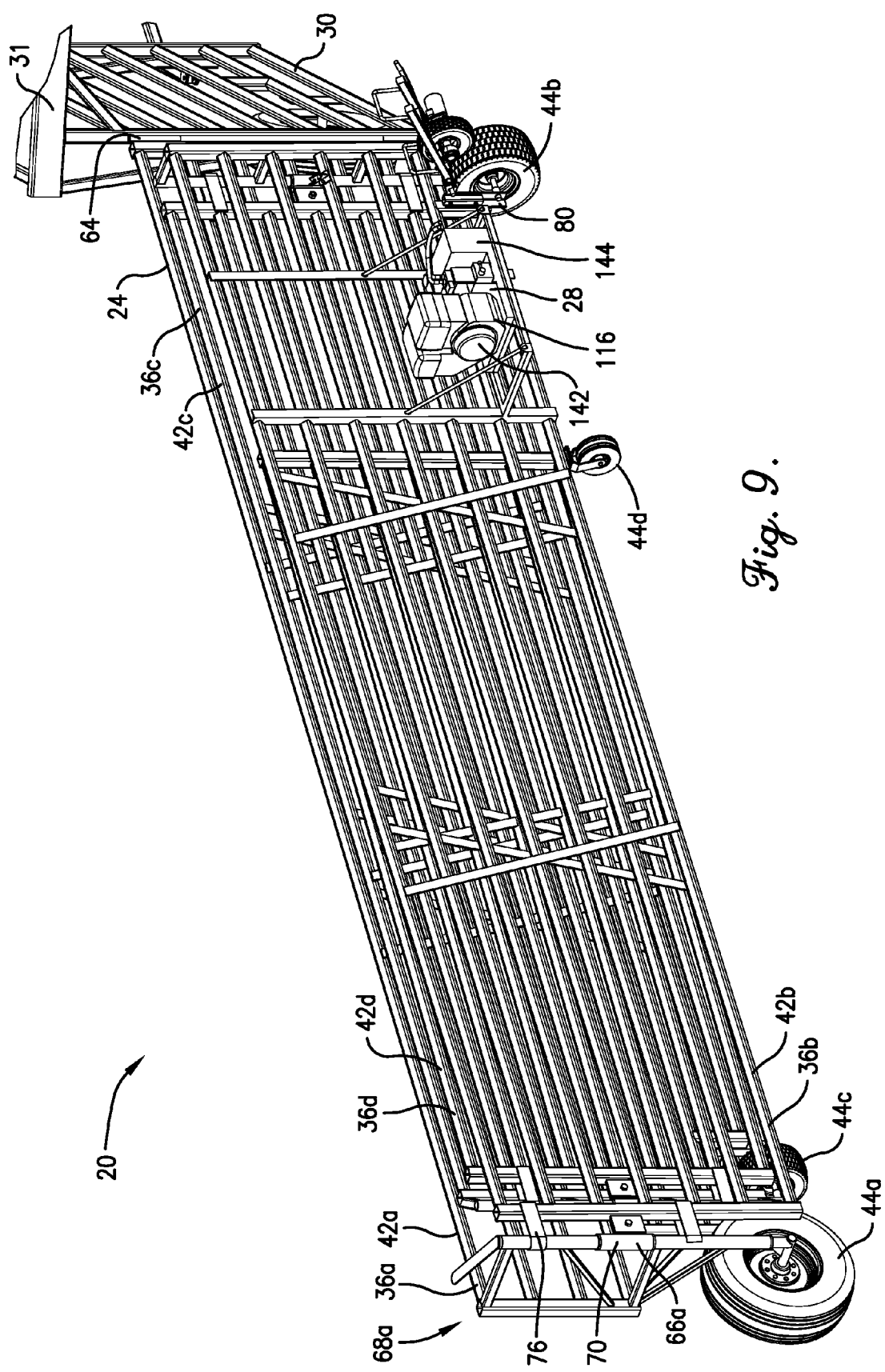
Figure 10:
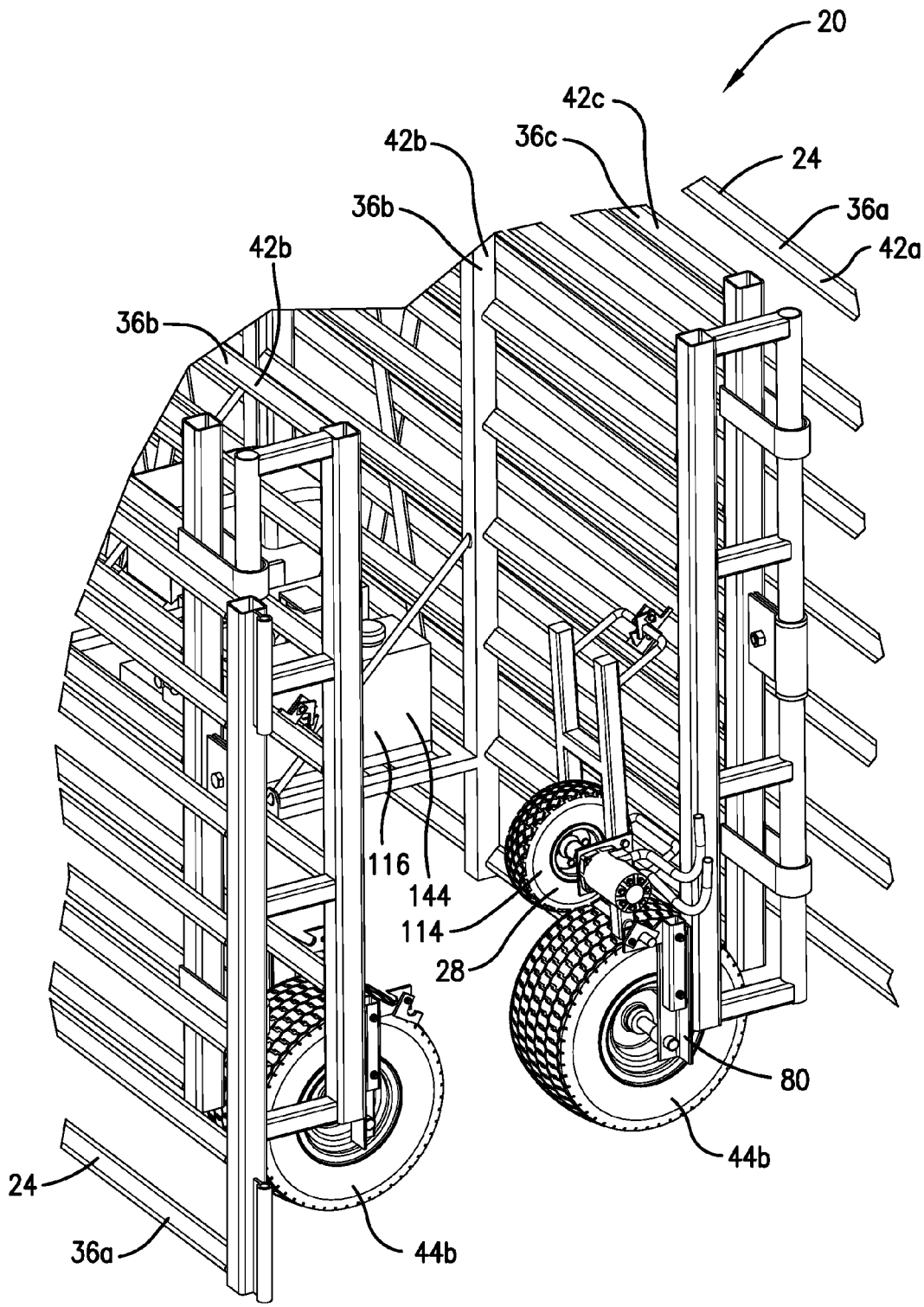
Figure 11:
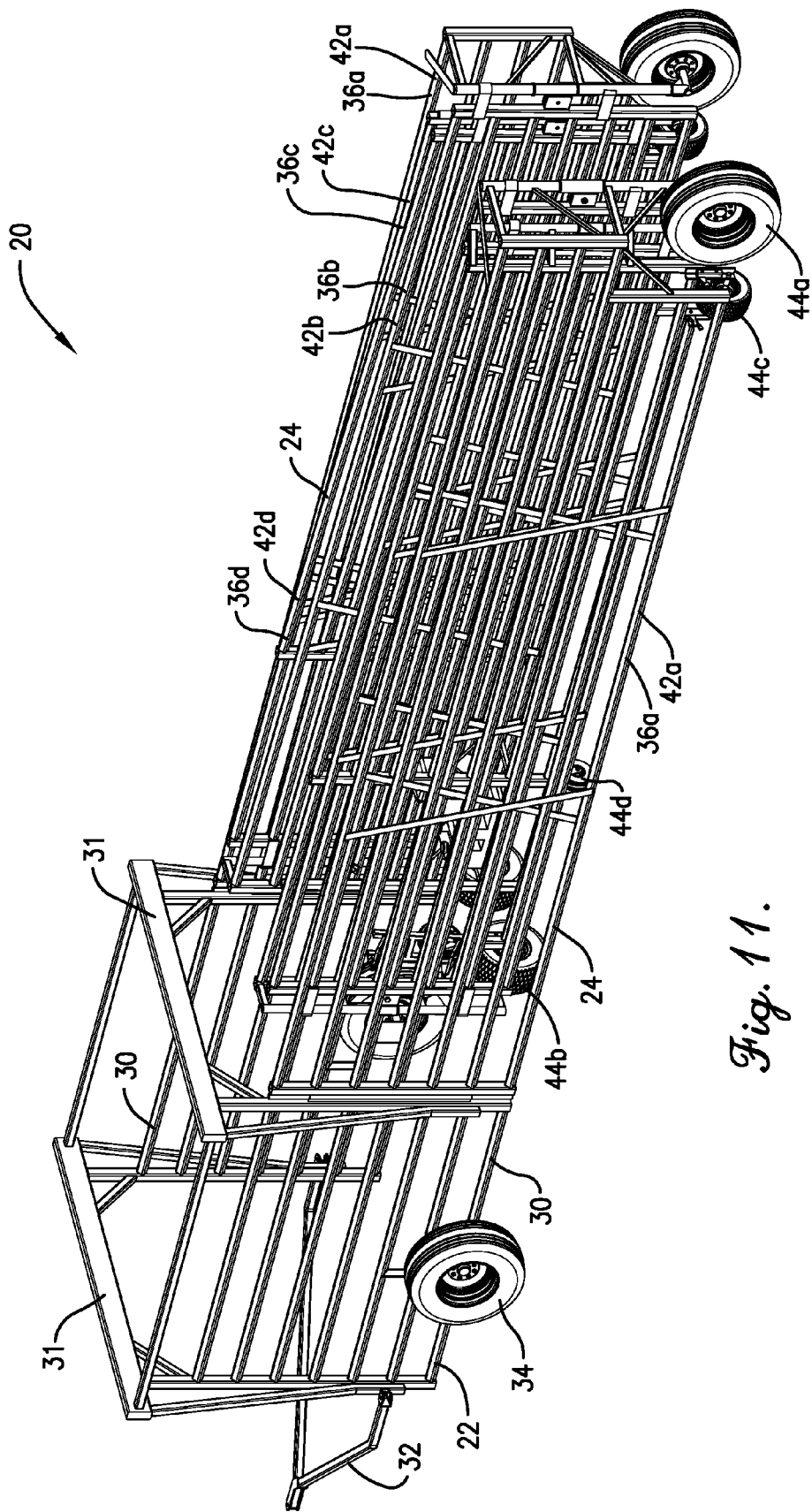
Figure 12:
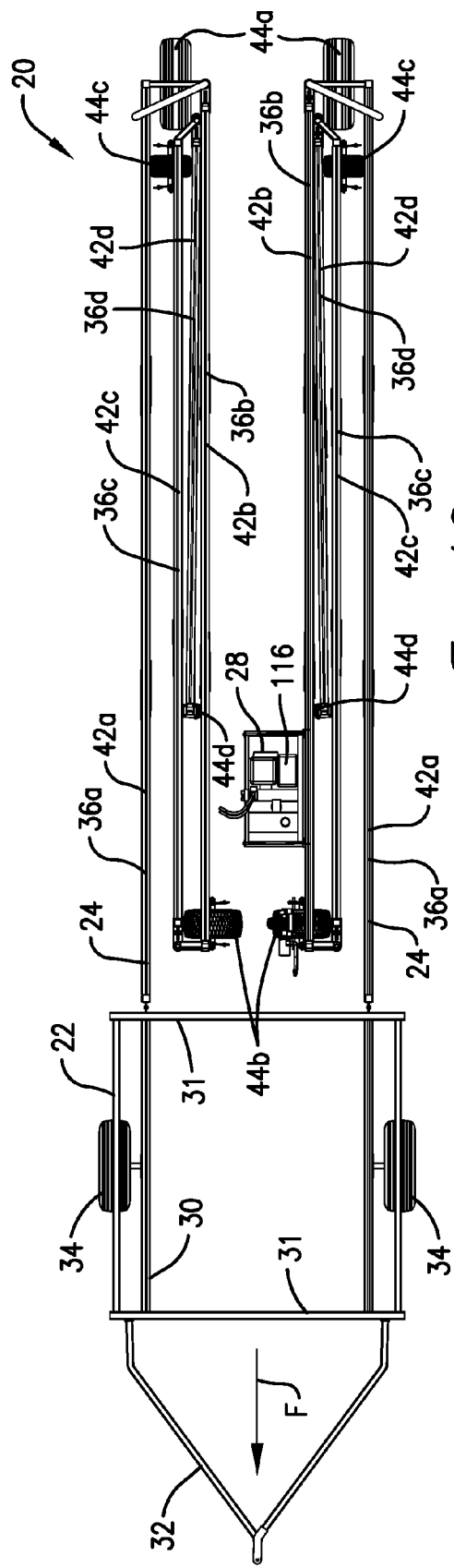
Figure 13:
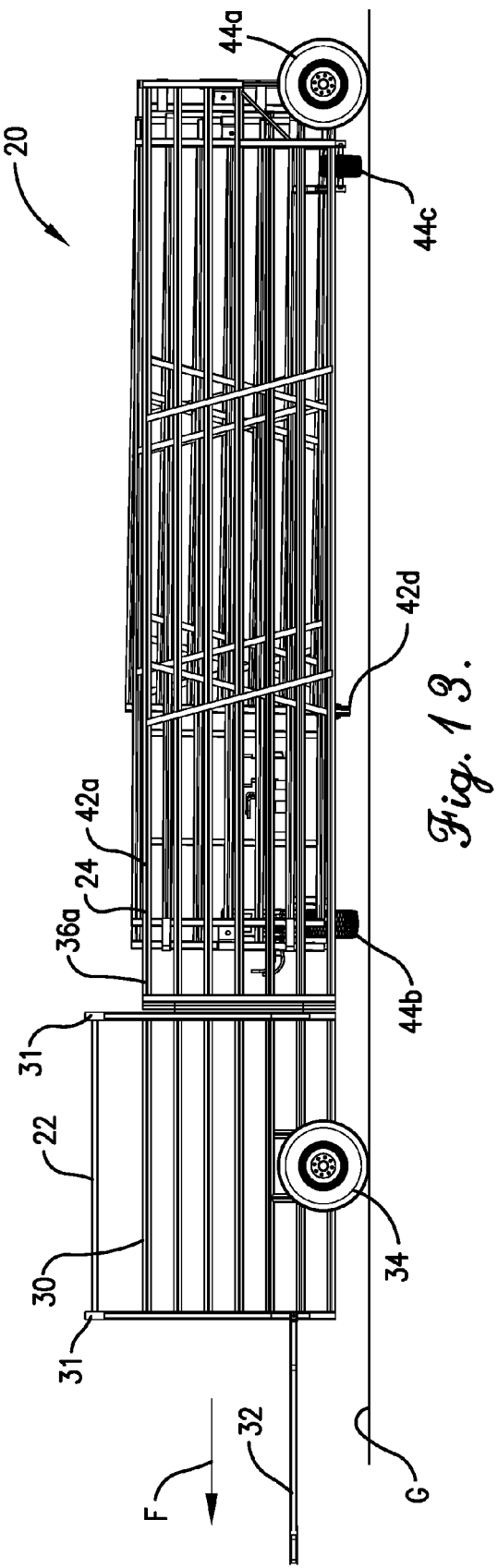
Figure 14:
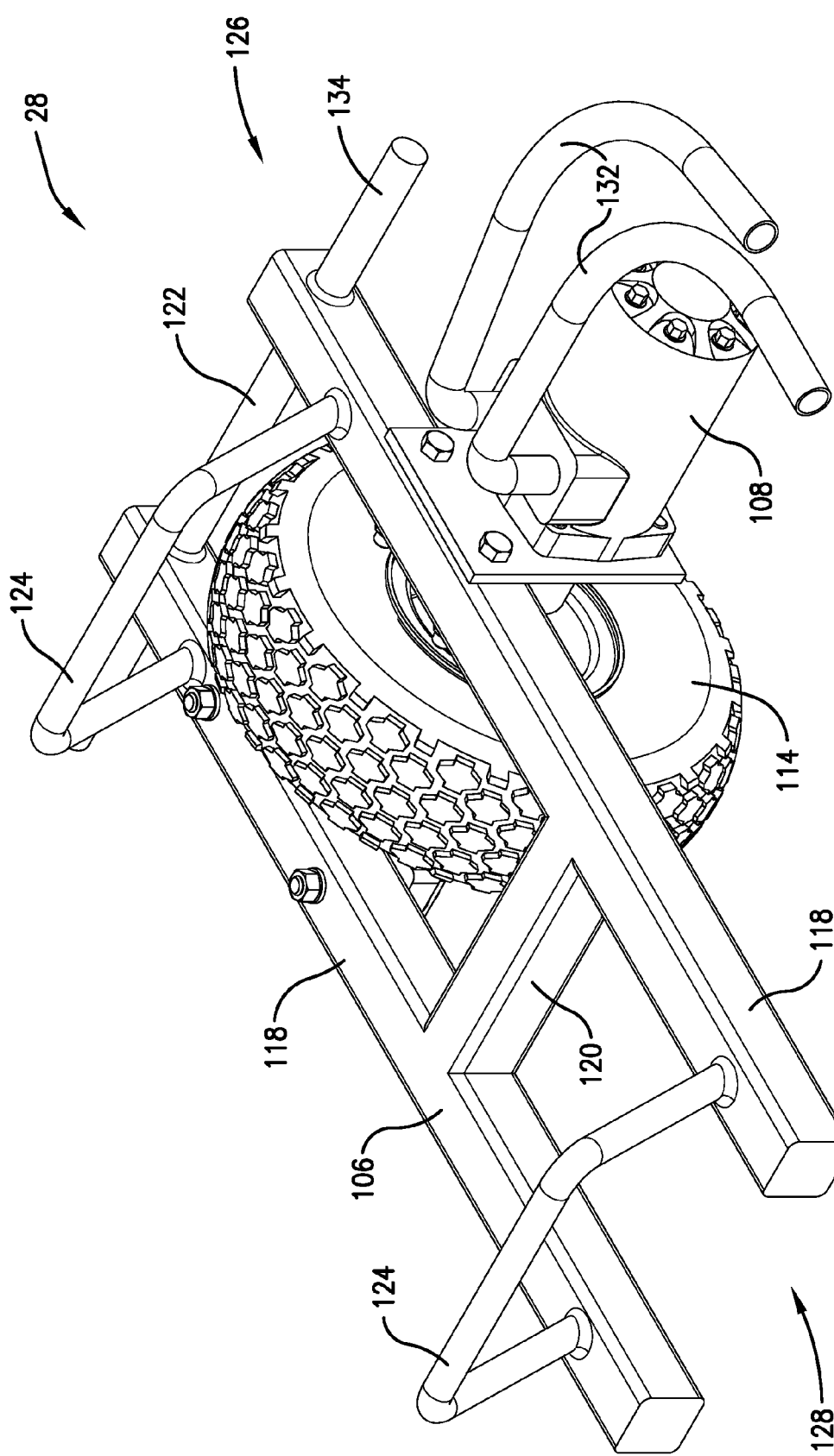
Figure 15:
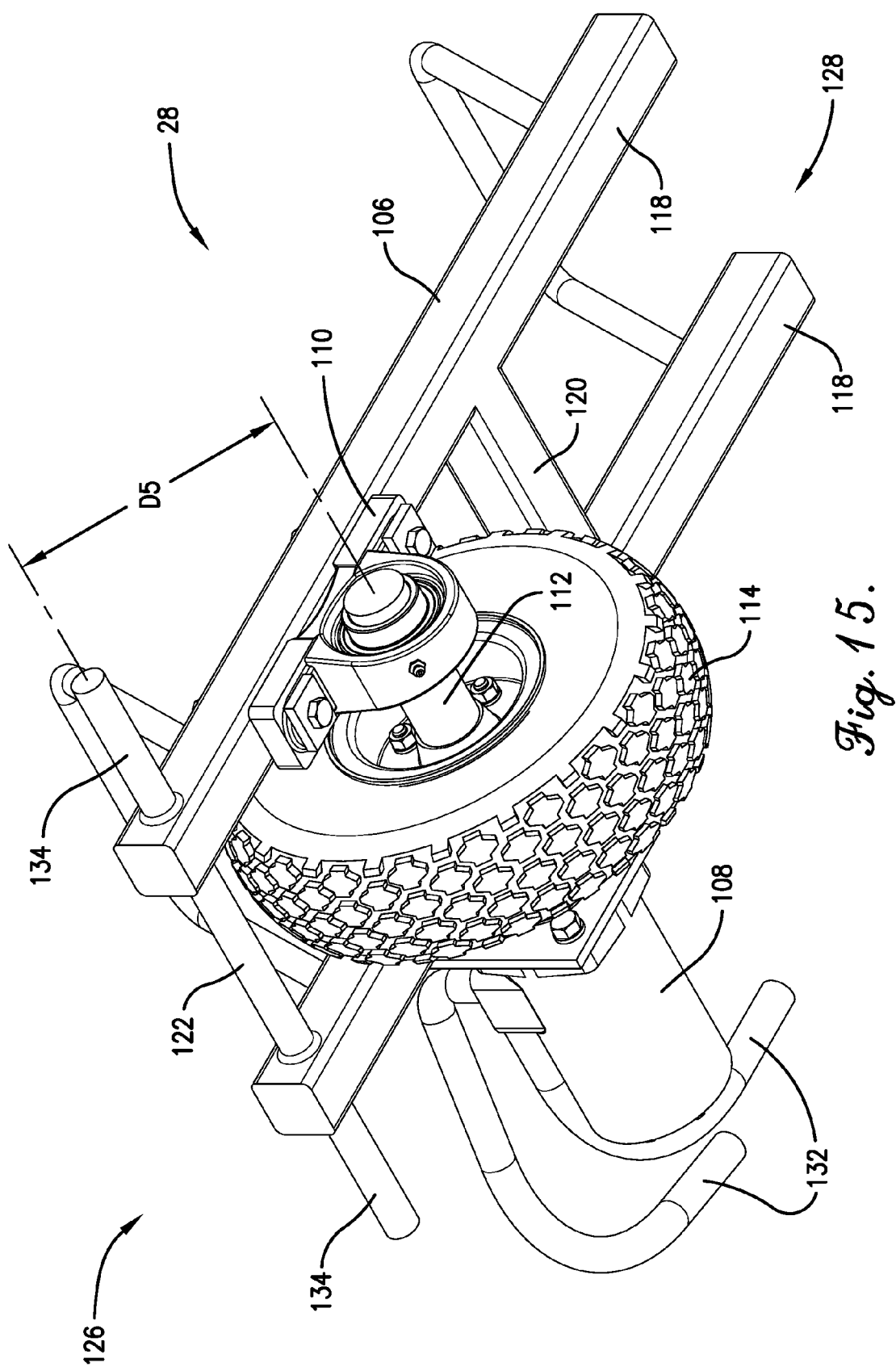
Figure 16:
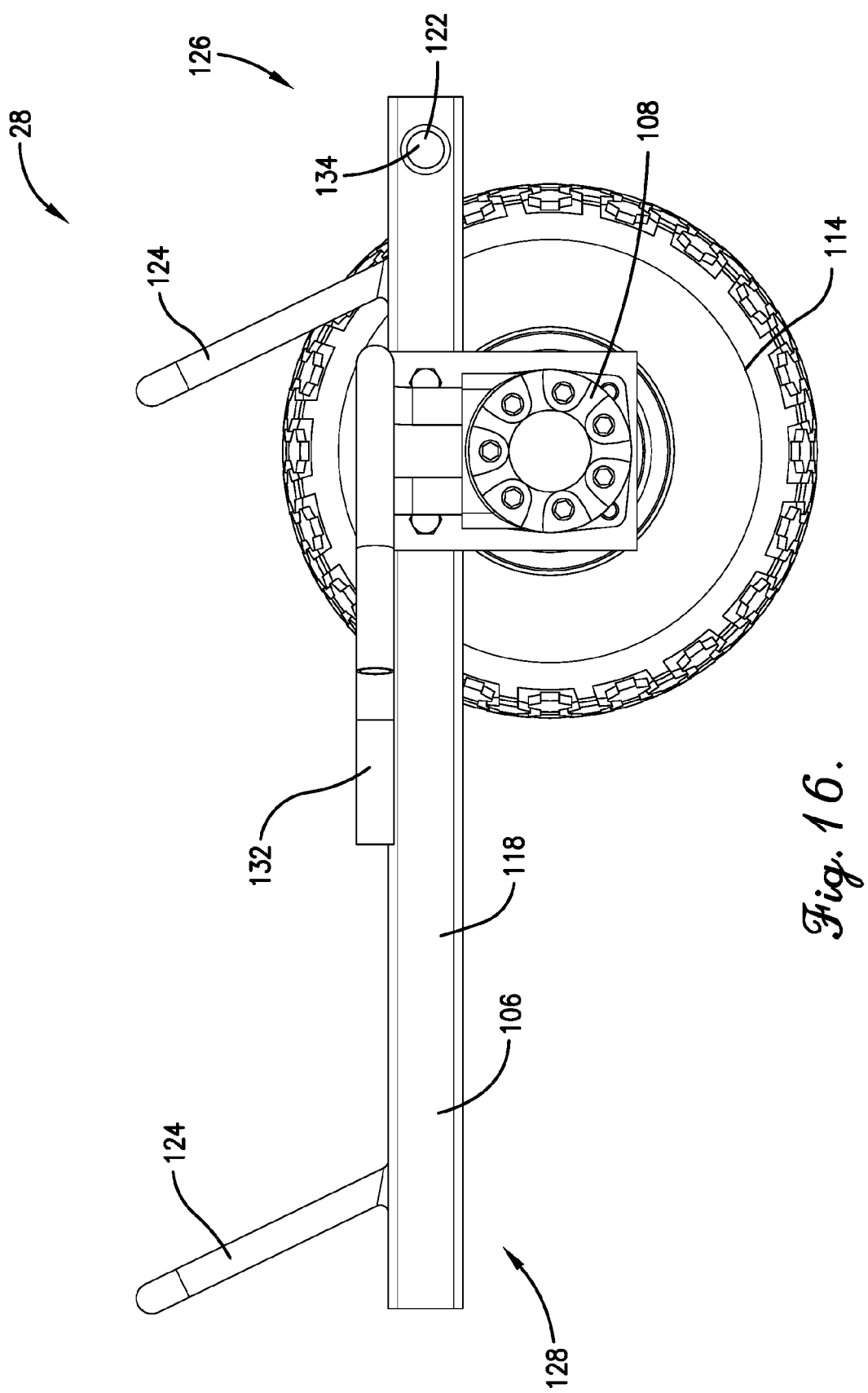
Figure 17:
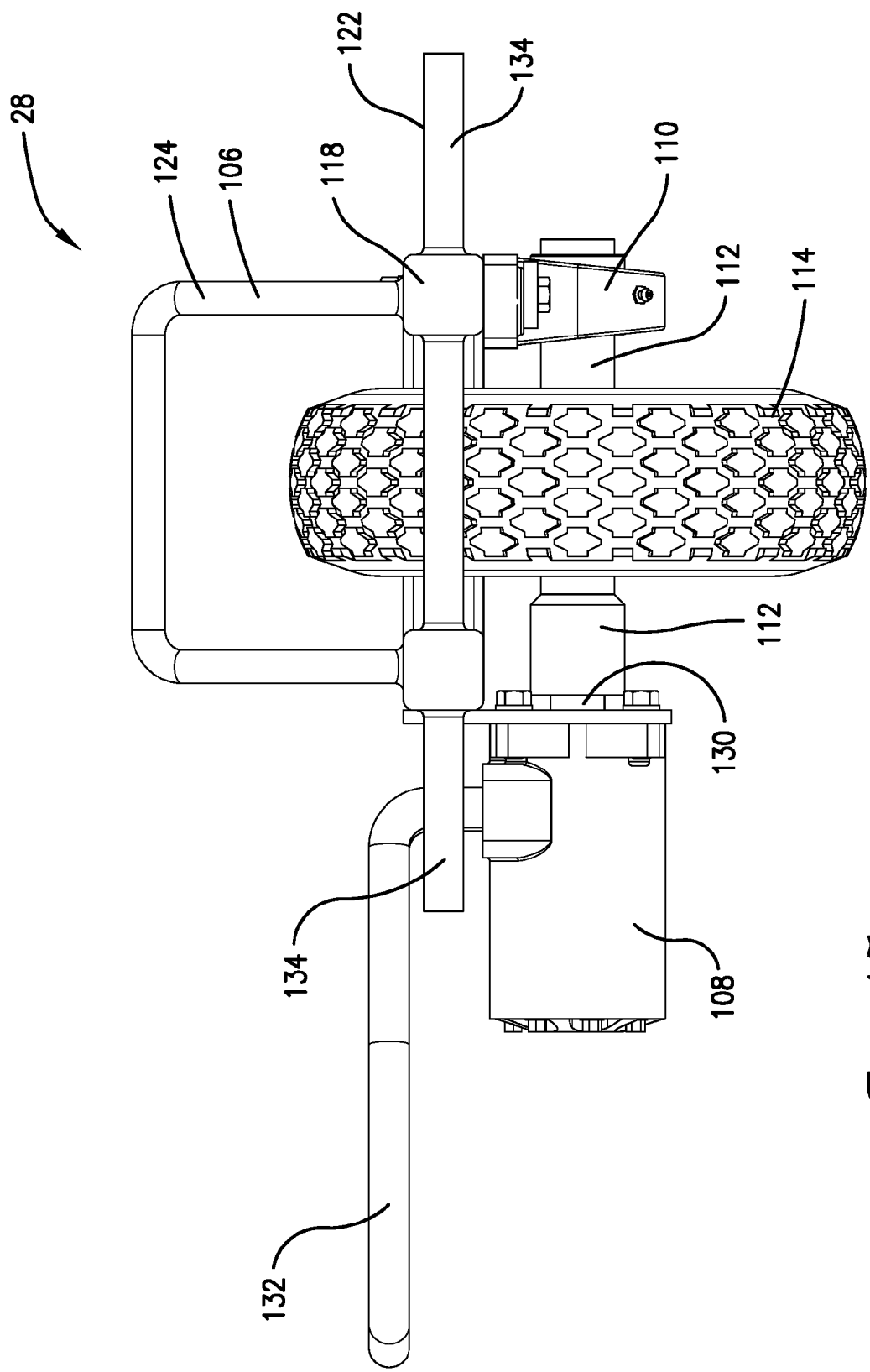
Figure 18:
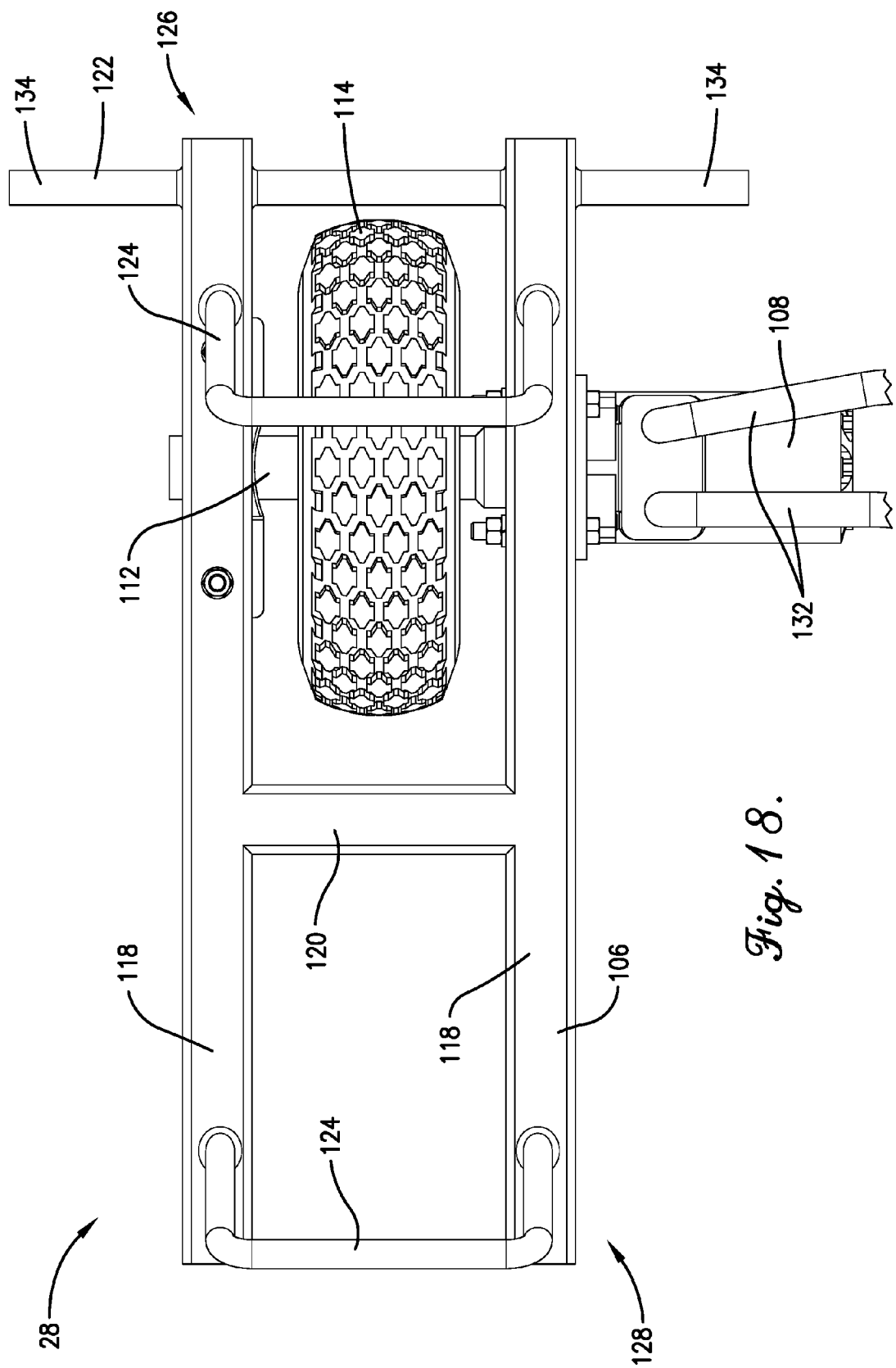
Figure 21:
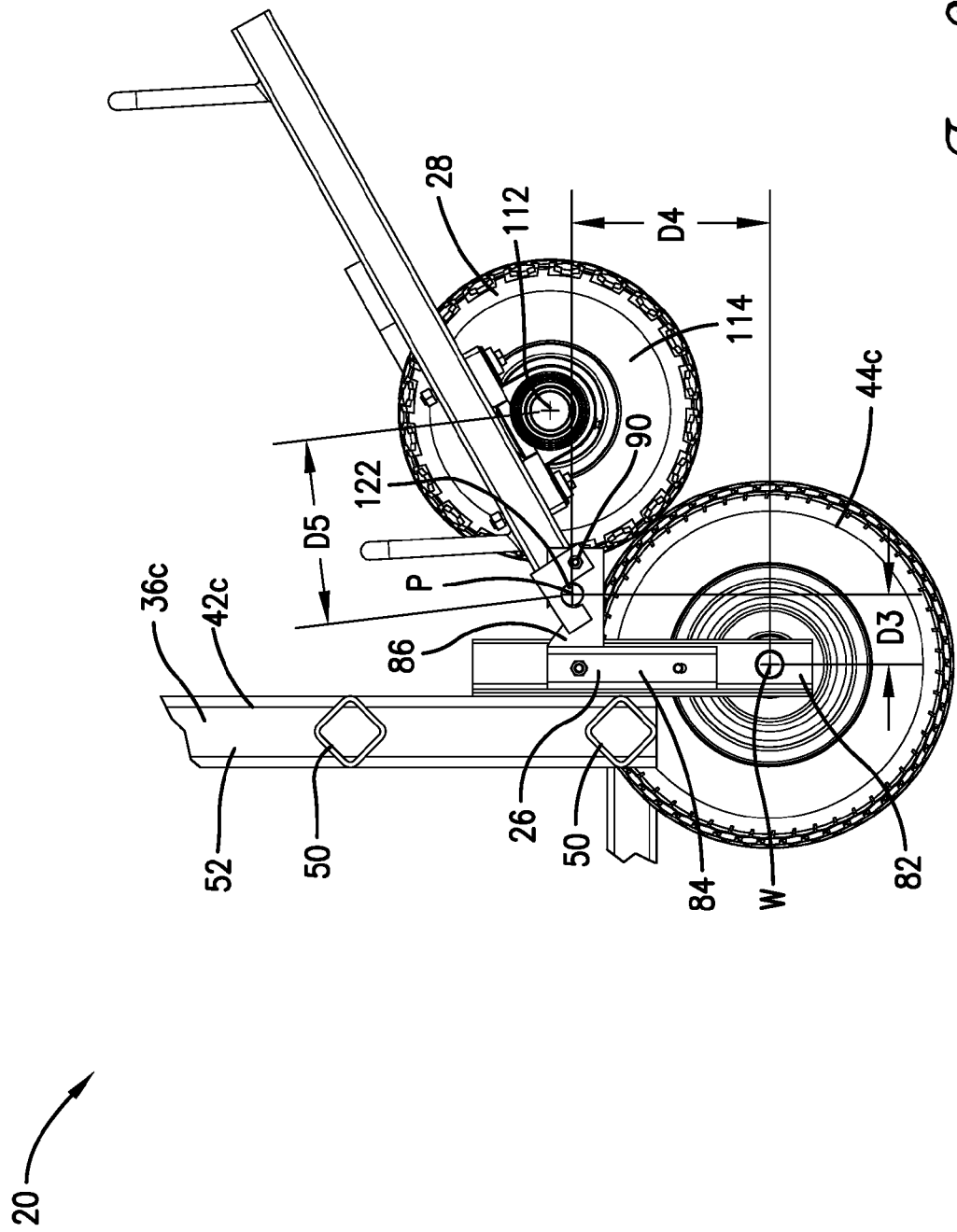
Figure 23:
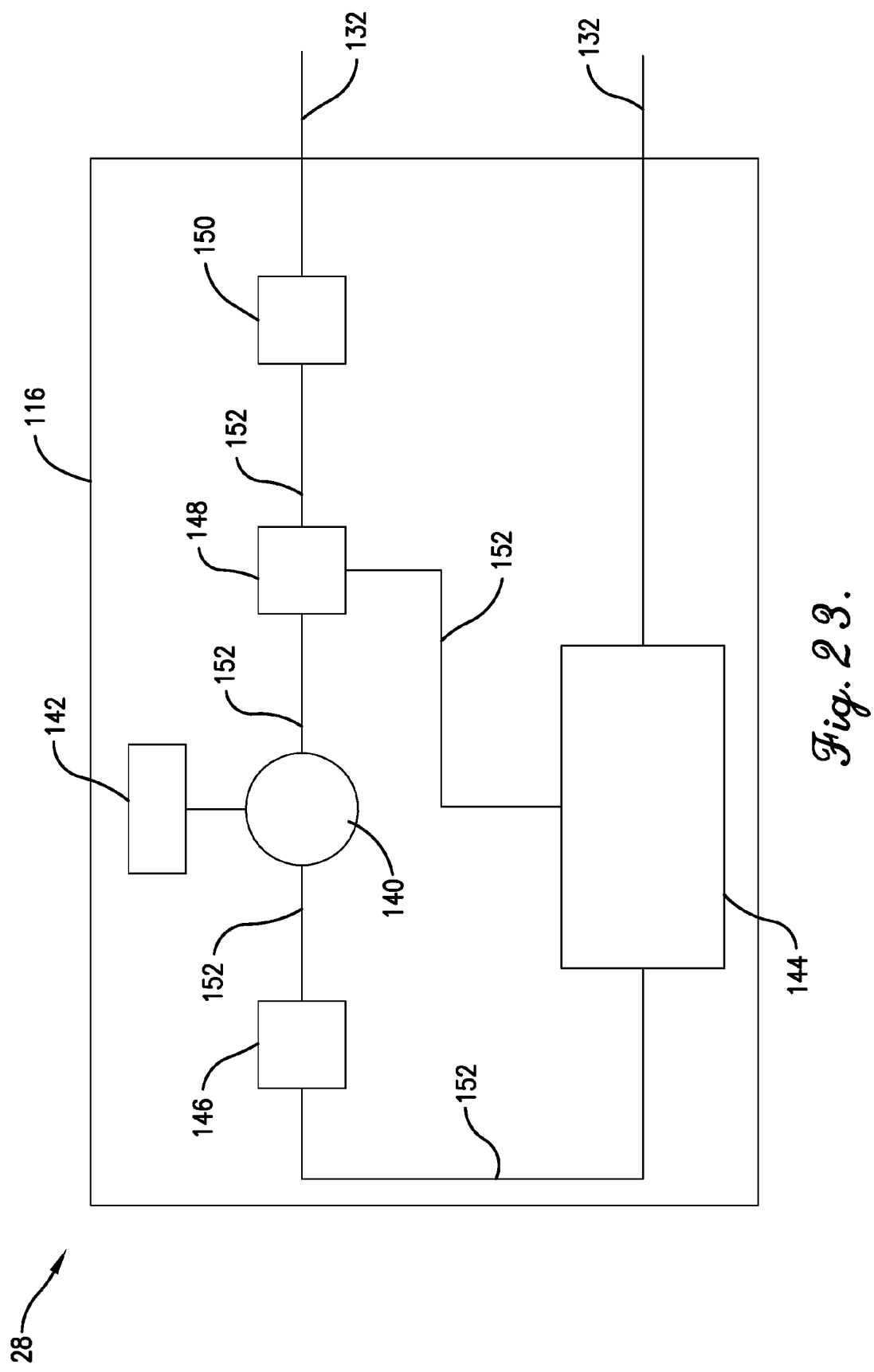

FIG. 4 is a fragmentary perspective of the corral system shown in FIGS. 1-3, showing first and second corral panels of one corral panel assembly pivotally attached to one another by a connection assembly that permits relative pivotal movement between the panels about a lateral panel axis and a vertical panel axis, with the first and second panels being positioned in an unfolded position; and with the drive system being removably attached to one of the panels with bracket assemblies;

FIG. 5 is a fragmentary perspective of the corral system shown in FIGS. 1-4, showing the first and second corral panels depicted in FIG. 4 folded alongside each other in a storage position and pivotally attached to a third corral panel by a second connection assembly;

FIG. 6 is a fragmentary perspective of the corral system similar to FIG. 4, but showing the first and second corral panels folded alongside one another in the storage position;

FIG. 7 is a fragmentary perspective of the corral system similar to FIG. 5, but showing the first, second, and third corral panels folded alongside one another in a storage position, with the third corral panel pivotally attached to a fourth corral panel by a third connection assembly;

FIG. 8 is a fragmentary perspective of the corral system similar to FIG. 7, but viewed from a different angle;

FIG. 9 is a fragmentary perspective of the corral system similar to FIG. 7, but showing the first, second, third, and fourth corral panels folded alongside one another in a storage position, with the fourth corral panel pivotally attached to the panel support chassis by a pivot joint;

FIG. 10 is a fragmentary perspective of the corral system shown in FIGS. 1-9, showing both corral panel assemblies folded into a storage condition for transportation of the corral system;

FIG. 11 is a perspective of the corral system shown in FIGS. 1-10, showing the corral panel assemblies folded into the storage condition and trailing the panel support chassis;

FIG. 12 is a top view of the corral system shown in FIGS. 1-11, showing the corral panel assemblies in the storage condition;

FIG. 13 is a side elevation of the corral system shown in FIGS. 1-12, showing the corral panel assemblies in the storage condition;

FIG. 14 is an upper fragmentary perspective of the drive system shown in FIGS. 1-13, showing a frame, hydraulic motor, driven wheel, and hydraulic lines of the drive system;

FIG. 15 is a lower fragmentary perspective of the drive system shown in FIGS. 1-14, showing the frame, the hydraulic motor, a bearing, a driven shaft, the driven wheel, and hydraulic lines of the drive system;

FIG. 16 is a fragmentary side elevation of the drive system shown in FIGS. 1-15;

FIG. 17 is a fragmentary end elevation of the drive system shown in FIGS. 1-16;

FIG. 18 is a fragmentary top view of the drive system shown in FIGS. 1-17;

FIG. 19 is an enlarged fragmentary perspective of the third corral panel shown in FIGS. 1-3, 5, and 7-13, showing bracket assemblies mounted on the panel frame;

FIG. 20 is a fragmentary side elevation of the third corral panel and the drive system shown in FIGS. 1-3, 5, and 7-13, showing the frame of the drive system removably mounted on the bracket assemblies attached to the third corral panel;

FIG. 21 is a fragmentary side elevation of the second corral panel and the drive system shown in FIGS. 1-13, showing the frame of the drive system removably mounted on the bracket assemblies attached to the second corral panel;

FIG. 22 is a fragmentary side elevation of one of the bracket assemblies shown in FIGS. 4, 6, 8-10, 20, and 21, showing a tubular body and a tab of the bracket assembly, with the tab presenting a slot;

FIG. 23 is a fragmentary schematic of the drive system shown in FIGS. 1-21, showing a power unit of the drive system.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Turning initially to FIGS. 1-3, a folding corral system 20 is constructed in accordance with a preferred embodiment of the present invention. The system 20 is preferably configured to be transported to and from a location to selectively collect and/or hold livestock (such as cattle or horses) within a space S. While depicted in FIGS. 1-3 as being setup in a configuration to enclose the space S, it will be appreciated that the panels of the corral system 20 can be selectively arranged in various configurations to enclose one or more spaces. For instance, the illustrated corral system 20 can be configured to form multiple discrete pens (not shown) for sorting livestock.

As will be discussed, the system 20 can be conveniently installed at the location and moved from the location to provide a temporary structure that forms one or more pens to contain animals. However, for some aspects of the present invention, components of the system 20 could be used as part of a permanent corral installation. The system 20 broadly includes a panel support chassis 22, corral panel assemblies 24, bracket assemblies 26 (e.g., see FIG. 19), and a drive system 28.

Turning to FIGS. 1-13, the illustrated panel support chassis 22 and corral panel assemblies 24 cooperatively provide a portable system that can be adjustably configured to provide one or more pens. The system 20 is foldable into and out of a transport condition (see FIGS. 11-13) where the corral panel assemblies 24 are stored for transportation of the system 20. In the transport condition, the system 20 can be towed behind a powered vehicle (not shown), such as a tractor or truck, in a forward direction F (see FIGS. 12 and 13).

The panel support chassis 22 includes side panels 30, cross beams 31, a tow tongue 32, and a pair of wheels 34 (see FIGS. 11-13). The side panels 30, cross beams 31, and tow tongue 32 cooperatively form a rigid structure. The wheels 34 are rotatably mounted to the side panels 30 on opposite sides of the chassis 22. In the usual manner, when the chassis 22 is being towed by a vehicle, the wheels 34 support the side panels 30 above the ground G (see FIG. 13) and allow the chassis 22 to roll behind the vehicle.

The illustrated system 20 preferably includes a pair of corral panel assemblies 24 that are independently shiftable relative to one another and are shiftable into and out of the transport condition. However, it is within the scope of the present invention where the system 20 includes a single corral panel assembly 24 or more than two corral panel assemblies 24. Because the corral panel assemblies 24 are mirror images of one another, only one of the corral panel assemblies 24 will be described in detail.

The corral panel assembly 24 is preferably shiftable between the transport condition (see FIGS. 11-13) and one of numerous deployed conditions (see, e.g., FIGS. 1-3). In this manner, the corral panel assembly 24 preferably provides an adjustably positionable barrier to direct and/or contain one or more animals. In the transport condition, the corral panels of the corral panel assembly 24 are preferably stored so as to be transported with the rest of the corral system 20. However, where the corral system 20 is a set of permanently installed corrals, the corral panels could be folded (or otherwise moved) into a storage condition similar to the transport condition for reasons other than transporting of the corral panels (e.g., to position the corral panels in a compact configuration).

The corral panel assembly 24 preferably includes multiple swingable corral panels 36a-d that extend between proximal and distal ends 38, 40 (see FIG. 3) of the corral panel assembly 24. As used herein, the terms "proximal" and "distal" refer to position along the length of the corral panel assembly 24 relative to the support chassis 22.

Each of the corral panels 36a-d preferably includes a corresponding rigid panel frame 42a-d and a corresponding support wheel 44a-d rotatably mounted on the panel frame 42a-d. The panel frames 42a-d present corresponding proximal ends 46a-d and distal ends 48a-d (see FIG. 3), with each support wheel 44 being mounted adjacent the respective distal end 48. In the usual manner, each of the panel frames 42 includes a plurality of lateral tubes 50 spaced vertically from one another and interconnected by upright end posts 52 and intermediate stanchions 54 (see FIGS. 4, 5, and 7).

The wheel 44a of the corral panel 36a is sized similarly to the wheel 34 and is pivotally mounted to the panel frame 42a adjacent the distal end 48 of the panel frame 42a. The wheel 44a pivots about a vertical axis into and out of a transport position (see FIG. 12) where the wheel axis is perpendicular to the length of the panel frame 42a and the corral panel 36a can be towed behind the chassis 22. The wheel 44a can be selectively locked in the transport position to restrict pivotal movement of the wheel 44a about the vertical axis. The corral panel 36a is pivotally attached to the chassis 22 at a pivot joint 64 (see FIGS. 3 and 9).

Still referring to FIGS. 1-13, each corral panel assembly 24 preferably includes connection assemblies 66 that interconnect respective corral panels 36 to one another. As will be described, the connection assemblies 66 cooperate with the respective corral panels 36 to provide multi-axis pivot joints 68 between pairs of corral panels 36. Each connection assembly 66 preferably includes a sleeve connector 70 and a tab connector 72 attached to a respective pair corral panels 36. The sleeve connector 70 is rotatably mounted to one of the corral panels 36 so that the pair of corral panels 36 can rotate relative to one another about a vertical panel axis V (see FIG. 4). The connectors 70, 72 are secured to one another with a threaded fastener 74 that permits relative pivotal movement between the connectors 70, 72 about a lateral panel axis L. Each connection assembly 66 also includes upper and lower brackets 76 fixed to one of the corral panels 36. The connection assemblies 66 preferably permit relative pivotal movement between the respective pair of corral panels 36 about the vertical panel axis V and the lateral panel axis L of the respective connection assembly 66.

The corral panel 36d preferably includes the panel frame 42d and a caster support wheel 44d (see FIG. 5). The support wheel 44d is pivotally mounted to the panel frame 42d at a lower corner thereof to pivot about a vertical axis and spin about a lateral wheel axis.

The corral panel 36d is pivotally mounted to the corral panel 36c by a connection assembly 66c of the corral panel assembly 24 (see FIG. 4). The connection assembly 66c cooperates with the corral panel 36c to provide a multi-axis pivot joint 68c. In particular, the connection assembly 66c pivotally interconnects the corral panels 36c,d to one another. The connection assembly 66c includes a sleeve connector 70 rotatably mounted to the corral panel 36c and a tab connector 72 fixed to the corral panel 36d (see FIG. 4). The sleeve connector 70 rotates so that the corral panels 36c,d can rotate relative to one another about the vertical panel axis V of the connection assembly 66c. Again, the connectors 70, 72 are secured to one another with a threaded fastener 74 that permits relative pivotal movement between the connectors 70, 72 about the lateral panel axis L of the connection assembly 66c (see FIG. 4).

The connection assembly 66c also includes upper and lower brackets 76 fixed to the corral panel 36d (see FIG. 4). The brackets 76 each present a slot 78 (see FIG. 4) that slidably receives a distal end post 52 of the corral panel 36c. Thus, the brackets 76 cooperatively guide the corral panels 36c,d as the corral panels 36c,d pivot about the lateral panel axis L of the connection assembly 66c. Consequently, the illustrated connection assembly 66c preferably permits relative pivotal movement between the corral panels 36c,d about both the vertical panel axis V and the lateral panel axis L of the connection assembly 66c.

In the transport condition, the corral panel 36d is preferably secured alongside the corral panel 36c with a chain (not shown) so that the corral panels 36c,d are substantially parallel to one another and also swing with one another (see FIG. 5). Furthermore, in the transport condition, the corral panel 36d is preferably raised and secured so that the caster support wheel 44d is spaced above the ground G. In other words, the corral panel 36d is preferably entirely supported by the corral panel 36c in the transport condition.

Turning to FIGS. 7-13 and 20, the corral panel 36b preferably includes the panel frame 42b and a support wheel 44b. The support wheel 44b is rotatably mounted between a pair of angle brackets 80 (see FIGS. 8, 19, and 20) so that the wheel axis is parallel to the length of the panel frame 42b. The illustrated wheel 44b preferably includes an eighteen inch (18") diameter tire (size 18×8.50-8), although the wheel 44b could be alternatively sized.

The corral panel 36b is pivotally mounted to the corral panel 36a by a connection assembly 66a (see FIGS. 8 and 9). The connection assembly 66a has substantially the same construction as the connection assembly 66c and cooperates with the corral panel 36a to provide a multi-axis pivot joint 68a (see FIGS. 8 and 9). The illustrated connection assembly 66a preferably permits relative pivotal movement between the corral panels 36a,b about respective vertical and lateral panel axes V, L of the connection assembly 66a.

The corral panel 36b is swingable into and out of a folded transport condition (see FIGS. 9-13). In the transport condition, the corral panel 36b is preferably secured alongside the corral panel 36a so that the corral panels 36a,b are substantially parallel to one another and also swing with one another (see FIG. 12).

Turning to FIGS. 4-7, 10-13, 19, and 21, the corral panel 36c preferably includes the panel frame 42c and a support wheel 44c. The support wheel 44c is rotatably mounted between a pair of angle brackets 82 (see FIGS. 4 and 21) so that the wheel axis is parallel to the length of the panel frame 42c. The illustrated wheel 44c preferably includes a thirteen inch (13") diameter tire (size 13×6.50-6), although the wheel 44c could be alternatively sized.

The corral panel 36c is pivotally mounted to the corral panel 36b by a connection assembly 66b (see FIGS. 5 and 7). The connection assembly 66b has substantially the same construction as the connection assembly 66c and cooperates with the corral panel 36b to provide a multi-axis pivot joint 68b (see FIGS. 5 and 7). Again, the illustrated connection assembly 66b preferably permits relative pivotal movement between the corral panels 36b,c about respective vertical and lateral panel axes V, L of the connection assembly 66b.

The corral panel 36c is swingable into and out of a folded transport condition (see FIGS. 9-13) where the corral panel 36c is preferably secured alongside the corral panel 36b so that the corral panels 36b,c are substantially parallel to one another and also swing with one another (see FIG. 12).

The illustrated panel assembly 24 preferably includes four (4) corral panels 36 connected in series with one another. However, it is within the scope of the present invention where the panel assembly 24 includes fewer than four corral panels 36 connected in series or more than four corral panels 36 connected in series.

The corral panels 36 are preferably connected to one another in series with the illustrated pivot joints 68. Furthermore, each pair of adjacent panels 36 have ends 46, 48 that are pivotally attached to one another. However, the pivot joints 68 could be alternatively located along the corral panels 36. For instance, one of the pivot joints 68 could be positioned at a location spaced between the ends 46, 48 of one of the corresponding panels 36.

Again, each pair of adjacent panels 36 includes a pivot joint 68 that permits relative swinging movement between the pair of adjacent panels 36. However, each pair of adjacent panels 36 could be alternatively shiftably connected. For instance, a pair of adjacent panels 36 could be slidably connected so that the panels 36 slide relative to one another (e.g., where the panels 36 slide relative to each other along a longitudinal panel axis). For instance, by being slidably attached to each other, a pair of panels 36 could cooperatively provide an adjustable-length panel assembly.

The panel support chassis 22 and corral panel assemblies 24 are cooperatively supplied as part of a corral system manufactured by Burlington Welding LLC (d/b/a Diamond W Corrals). However, the principles of the present invention are equally applicable if an alternative corral system is used.

Turning to FIGS. 4-8 and 19-22, a pair of bracket assemblies 26 is preferably mounted on each corral panel 36b,c to permit selective attachment of the drive system 28 to each of the corral panels 36b,c. Each bracket assembly 26 preferably includes a tubular body 84, a tab 86 fixed to the body 84, and a finger 88 pivotally attached to the tab 86 with a fastener 90 (see FIGS. 19-22).

The illustrated tab 86 preferably presents a slot 92 that defines a slot axis 94 and a slot end 96 (see FIG. 22). The body 84 presents an upright axis 98 that cooperates with the slot axis 94 to form a slot angle A (see FIG. 9). The slot angle A preferably ranges from about forty-five degrees (45°) to about sixty-five degrees (65°) and, more preferably, is about fifty-five degrees (55°).

The finger 88 is preferably unitary and presents a slot 100 that defines a slot end 102 (see FIGS. 19 and 20). The tab 86 and finger 88 both present a fastener opening 104. The fastener opening 104 of the finger 88 is spaced to one side of the slot 100 and positioned adjacent to an end of the finger 88.

The finger 88 and tab 86 are pivotally connected to each other with the fastener 90 by extending the fastener 90 through the respective openings 104. Thus, the finger 88 can preferably be swung between open positions (see FIG. 19) and a closed position (see FIGS. 20 and 21).

The bracket assemblies 26 are preferably removably mounted to the corral panels 36 with threaded fasteners 105 (see FIG. 19). In this manner, the bracket assemblies 26 and the drive system 28 can be supplied as an aftermarket kit for use with the corral panel assemblies 24. While the illustrated construction of bracket assemblies 26 is preferred, the principles of the present invention are applicable where the corral system 20 has an alternative bracket structure 26 to attach the drive system 28 to the panel. For instance, the bracket assemblies 26 could be integrally formed as part of the respective corral panels 36.

One pair of bracket assemblies 26 is mounted on the corral panel 36b in a location above the respective wheel 44b (see FIGS. 19 and 20). Preferably, the bracket assemblies 26 are positioned relative to the wheel 44b so that a pivot axis P of the drive system 28, when mounted in the slot 92 at the slot end 96, is offset from an axis W of the wheel 44b (see FIG. 20). In particular, the pivot axis P is laterally offset from the wheel axis W of wheel 44b a lateral distance D1 that ranges from about one inch (1") to about five inches (5") and, more preferably, is about three inches (3") (see FIG. 20). Also, the pivot axis P is vertically offset from the wheel axis W of wheel 44b a vertical distance D2 that ranges from about five inches (8") to about fifteen inches (15") and, more preferably, is about ten inches (10") (see FIG. 20).

Another pair of bracket assemblies 26 is mounted on the corral panel 36c in a location above the respective wheel 44c (see FIGS. 4 and 21). Preferably, the bracket assemblies 26 are positioned relative to the wheel 44c so that a pivot axis P of the drive system 28, when mounted in the slot 92 at the slot end 96, is offset from an axis W of the wheel 44c (see FIG. 21). In particular, the pivot axis P is laterally offset from the wheel axis W of wheel 44c a lateral distance D3 that ranges from about one inch (1") to about five inches (5") and, more preferably, is about three inches (3") (see FIG. 21). Also, the pivot axis P is vertically offset from the wheel axis W of wheel 44c a vertical distance D4 that ranges from about five inches (5") to about ten inches (10") and, more preferably, is about seven inches (7").

The bracket assemblies 26 are positioned on opposite sides of the respective wheel 44b,c to receive corresponding pin sections of the drive system 28. As will be discussed, the bracket assemblies 26 permit the pin sections to be inserted and removed from the slots 92 when the fingers 88 are in the open position. Also, the bracket assemblies 26 restrict the pin sections from being inserted and removed when the fingers 88 are in the closed position.

Turning to FIGS. 1, 4, and 14-22, the drive system 28 is operable to drivingly swing one of the corral panels 36b,c through a range of positions relative to a proximally adjacent corral panel 36. As will be discussed, the drive system 28 is configured to be attached to either of the corral panels 36b,c and to frictionally engage the wheel 34b,c of the corral panel 36b,c. That is, the drive system 28 can be selectively attached one of the corral panels 36b,c to swing the corral panel 36. The drive system 28 can then be detached from the corral panel 36 and then attached to the other one of the corral panels 36b,c to swing the other corral panel 36. The drive system 28 is preferably configured to permit the operator to freely position the drive system 28 among the corral panels 36b,c to permit such use. The drive system 28 preferably includes a frame 106, a hydraulic motor 108, a pillow block bearing 110, a driven shaft 112, a driven wheel 114, and a power unit 116.

The frame 106 is preferably unitary and includes a pair of tubes 118 extending side-by-side. The tubes 118 are interconnected by cross-member 120, connecting pin 122, and handles 124. Preferably, cross-member 120, connecting pin 122, and handles 124 are welded to the tubes 118 so that the frame 106 comprises a unitary, rigid structure. However, it is within the ambit of the present invention where the frame 106 is alternatively constructed. The illustrated frame 106 presents front and rear ends 126, 128, with the connecting pin 122 located adjacent the front end 126. While the drive system 28 preferably includes the illustrated frame 106, it is also within the scope of the present invention where the frame 106 is alternative constructed and/or configured. Furthermore, the drive system 28 could be devoid of frame 106 (e.g., where the motor 108 is connected directly to the panel 36b,c).

The hydraulic motor 108 preferably comprises a conventional positive displacement motor. More preferably, the illustrated motor 108 is a Hydraulic Pump Model No. EAT-101-1004, supplied by Eaton Char-Lynn. While the illustrated motor 108 is preferably used to drive the wheel 114, it is within the scope of the present invention where an alternative motor powers the wheel 114. For some aspects of the present invention, the motor 108 could comprise an electric motor that drives the wheel 114.

The motor 108 is secured to one of the tubes 118 with threaded fasteners. The motor 108 includes a drive shaft 130 (see FIG. 17) that projects transversely to the tubes 118 and is attached to the driven shaft 112. The motor 108 is preferably fluidly connected to the power unit 116 with flexible hydraulic lines 132. The hydraulic lines 132 are conventional flexible lines and cooperatively move hydraulic fluid to and from the motor 108 to spin the drive shaft 130. The hydraulic lines are sized and configured to permit the drive system 28 to be freely positioned for engagement with one of the corral panels 36b,c. When not in use, the hydraulic lines 132 can be rolled up and stored on the corral panel 36b or in another convenient location.

However, the principles of the present invention are equally applicable where hydraulic fluid is alternatively provided to the motor 108. For instance, because the illustrated power unit 116 is mounted on the corral panel 36b, the drive system 28 could include rigid hydraulic lines (not shown) fixed to and extending along the corral panels 36b,c to rigidly mounted, quick-couple, hydraulic connectors located adjacent the wheels 44b,c. In such an alternative configuration, the drive system 28 could have relatively short flexible hydraulic lines coupled to the motor 108, where the flexible hydraulic lines have hydraulic connectors that are selectively attachable to (and detachable from) the rigidly mounted hydraulic lines. The alternative drive system 28 could also have flexible hydraulic lines that fluidly connect the rigid hydraulic lines of adjacent corral panels 36 to permit relative swinging movement between the corral panels 36.

Yet further, for some aspects of the present invention, power could be alternatively provided to the motor 108. For instance, where the motor 108 comprises an electric motor, the drive system 28 could include one or more electric batteries (not shown) mounted on the frame 106 to power the motor 108. In such an alternative embodiment, the motor 108 could receive power entirely from such batteries. However, electric power could also come from any of various electric power sources, such as a gas-powered generator, a panel of solar cells, one or more batteries, or a combination thereof.

The pillow block bearing 110 is conventional and preferably comprises a Nortrac one and three-eighths inch (1⅜") pillow block, Item No. 189559, supplied by Northern Tool & Equipment. The bearing 110 is attached to the tube 118 opposite the motor 108 with threaded fasteners. The drive shaft 130 and bearing 110 cooperatively rotatably support the driven shaft 112. Again, the driven shaft 112 is mounted to and spins with the drive shaft 130. The driven shaft 112 is preferably positioned to define a distance D5 (see FIGS. 15 and 21) measured from the centerline of the connecting pin 122 to the centerline of the driven shaft 112. The distance D5 preferably ranges from about five inches (5") to about ten inches (10") and, more preferably, is about seven and a half inches (7.5").

The wheel 114 preferably includes a conventional tire mounted on a rim. The tire preferably comprises a ten inch (10") diameter tire, although the wheel 114 could be alternatively sized. The wheel 114 is mounted on and rotates with the driven shaft 112. The wheel 114 is preferably mounted between the tubes 118. It is also within the ambit of the present invention where the wheel 114 is alternatively rotatably mounted relative to the frame 106.

The illustrated connecting pin 122 comprises a unitary rod that is welded to the tubes 118. When secured to the tubes 118, the connecting pin 122 presents end sections 134 (see FIGS. 14-18) that project laterally outwardly from the tubes 118.

Turning to FIGS. 19-21, the frame 106 of the drive system 28 is removably attached to the bracket assemblies 26 by inserting the connecting pin 122 into the tabs 86. In particular, each end section 134 of the connecting pin 122 slides into the slot 92 of a corresponding one of the tabs 86 until the end section 134 engages the slot end 96. With the bracket assemblies 26 being positioned side-by-side and in the open position, the end sections 134 are preferably inserted simultaneously into the slots 92. Similarly, the end sections 134 are preferably removed simultaneously from the slots 92.

While the illustrated pivotal connection between the drive system 28 and the corral panels 36 is preferred, the pivotal connection could be alternatively constructed without departing from the scope of the present invention. For instance, the system 20 could be configured so that the bracket assemblies 26 include the connecting pins and the frame 106 presents a pair of slots to pivotally receive the connecting pins.

As discussed, the slot 92 is preferably formed to present the slot angle A. Because the bracket assemblies 26 are positioned on the panel 36 so that the body 84 is upright, the slot angle A preferably defines an angle between the slot axis 94 and an upright direction. That is, the slot 92 is oriented at an oblique angle relative to the upright direction. Also, when the frame 106 of the drive system 28 is mounted to the bracket assemblies 26, the slot 92 is preferably oriented so that the slot axis 94 extends transversely to and intersects a line (not shown) extending from the wheel axis W to the centerline of the driven shaft 112 (see FIGS. 20 and 21), with the slot end 96 being the lowermost extent of the slot 92. It has been found that this orientation of the slot 92 urges the end sections 134 to remain in the slots 92.

When the end sections 134 are inserted in the slots 92, the fingers 88 can be moved from the open position to the closed position. In the closed position, each finger 88 is biased by its weight to remain closed. Specifically, because the fastener opening 104 is offset to one side of the slot 92 and is positioned adjacent an end of the finger 88, the weight of the finger 88 urges the finger 88 to remain closed.

Thus, the bracket assemblies 26 and frame 106 cooperatively permit the drive system 28 to be selectively pivotally attached to one of the panels 36b,c. When pivotally attached to one of the panels 36b,c, the frame 106 of the drive system 28 can be swung into and out of a frictional engagement position where the wheel 114 frictionally engages the wheel 44b,c of the corresponding panel 36b,c (e.g., see FIGS. 20 and 21). Furthermore, the operator can apply downward force (or even an upward force) to the frame 106 (e.g., where the operator applies downward force to one or both of the handles 124) in the engagement position to selectively change the degree of frictional engagement between the wheel 114 and the corresponding wheel 44b,c. For instance, as the drive system 28 is used to swing one of the corral panels 36b,c, the operator can selectively apply a force to the frame 106 to ensure that substantially all of the driving power from the motor 108 is transmitted to the wheel 44b,c. Alternatively, as the drive system 28 is used to swing one of the corral panels 36b,c, the operator can selectively apply a force to the frame 106 so that only some of the driving power from the motor 108 is transmitted to the wheel 44b,c. That is, the operator can move the frame 106 to cause at least some wheel slip between the wheel 114 and the wheel 44b,c.

When pivotally attached to the panel 36b, the frame 106 of the drive system 28 can also be swung into and out of a storage position where the wheel 114 is spaced (and thereby disengaged) from the wheel 44b of the panel 36b (e.g., see FIG. 19). The frame 106 is operable to be secured in the storage position with a bracket 136 secured to the panel 36b. While not shown, the panel 36c could also include a bracket 136 to secure the frame 106 in a storage position. The bracket 136 includes a base 138 and a pivotal finger 139. The base 138 presents a slot that receives a corresponding one of the handles 124 when the frame 106 is secured to the bracket 136.

To disengage the frame 106 from the bracket assemblies 26 and thereby remove the drive system 28 from one of the corral panels 36b,c, the operator moves the fingers 88 from the closed position to the open position. The operator can then move the frame 106 so that the end sections 134 slide out of engagement with the slots 92. Consequently, the bracket assemblies 26 and frame 106 cooperatively permit the drive system 28 to be selectively detached from one of the corral panels 36b,c. In this manner, the drive system 28 can be stored, then reattached to the same corral panel 36b,c, or then attached to another one of the corral panels 36b,c. That is, the drive system 28 can be selectively positioned to move any one of the corral panels 36b,c in any order desired by the operator.

However, the principles of the present invention are equally applicable where the drive system 28 is alternatively configured to swing the corral panels 36b,c. Instead of frictionally driving the wheel 44b,c of the corresponding panel 36b,c using the wheel 114, the drive system 28 could be alternatively engaged with the wheel 44b,c. For instance, the motor 108 could be connected to the driven shaft 112 of the wheel 114 via a drive assembly, such as a chain-and-sprocket drive, a belt-and-pulley drive, or a gear drive. As will be appreciated by one of ordinary skill in the art, such drive assemblies can be selectively engaged, to transmit power to the wheel 114, and selectively disengaged, to restrict power transmission to the wheel 114. When using such a drive assembly, the motor 108 could be removably attached to the drive assembly so that the motor 108 could still be used to selectively drive any one of the corral panels 36b,c. For instance, the drive shaft 130 of the motor 108 could be splined and slidably mounted in a splined hole presented by the drive assembly.

For some aspects of the present invention, the motor 108 could be fixed to one of the corral panels 36b,c so that the motor 108 is not selectively detachable to use with the other corral panels 36b,c. For instance, each of the illustrated corral panels 36b,c could receive and support a corresponding motor 108 fixed thereto, with all of the motors 108 being in fluid communication with and powered by the power unit 116.

Turning to FIG. 23, the power unit 116 is configured to power the motor 108 by moving hydraulic fluid to and from the motor 108. The power unit 116 preferably includes a hydraulic pump 140, an internal combustion engine 142, a fluid sump 144, a filter 146, a variable flow valve 148, a wireless supply valve 150, fluid lines 152, and a wireless operator control (not shown) that wirelessly communicates with the supply valve 150.

The hydraulic pump 140 preferably comprises a conventional positive displacement pump. The illustrated pump is approximately a one half cubic inch (0.517 cu in.) gear pump, Model No. 10567, supplied by Concentric. In the usual manner, the pump 140 is drivingly powered by the engine 142. The pump 140 is in fluid communication with and receives hydraulic fluid from the sump 144 via the filter 146. The pump 140 discharges pressurized fluid, which can be directed either to the motor 108 via one of the hydraulic lines 132 or to the sump 144.

The engine 142 is a conventional thirteen horsepower (13 hp) combustion engine. In the usual manner, the pump 140 is drivingly powered by the engine 142.

The wireless supply valve 150 is fluidly connected to the pump discharge (not shown) and the one hydraulic line 132 to selectively permit fluid flow from the pump 140 to the hydraulic line 132 (when the supply valve 150 is open) or restrict fluid flow from the pump 140 to the hydraulic line 132 (when the supply valve 150 is closed). The operator uses the wireless control (not shown) to wirelessly communicate with the supply valve 150 and thereby open or close the supply valve 150.

The variable flow valve 148 is fluidly connected between the pump discharge and the supply valve to control the amount of fluid that goes to the hydraulic line 132 when the supply valve 150 is open. The flow valve 148 preferably can be controlled to provide a flow of hydraulic fluid that ranges from about zero gallons per minute (0 gpm) to about eight gallons per minute (8 gpm). The flow valve 148 preferably comprises a valve Model No. PRI-150-8, supplied by HCI-Prince.

While the power unit 116 is preferred to provide a flow of hydraulic fluid to the motor 108, the motor 108 could be alternatively powered. For instance, the motor 108 could be fluidly connected to various hydraulic power units, including hydraulic power units integrated into various types of vehicles. For example, the motor 108 could be fluidly connected to the hydraulic power supply of a truck-mounted grasping mechanism used to pick up and haul round bales of forage hay. Similarly, the motor 108 could be fluidly connected to the hydraulic power supply of an agricultural tractor.

It is also within the scope of the present invention where the power unit 116 is electrically powered rather than being powered by a gasoline-powered combustion engine. For instance, the power unit 116 could include a so-called "electric-over-hydraulic" power pack (not shown) with an electric motor and a hydraulic pump drivingly powered by the electric motor. One suitable power pack comprises a Model No. DB1644 Power Pack, rated at two and one half gallons per minute (2.5 gpm) at twenty five hundred pounds per square inch (2500 psi), and supplied by the Stone division of SPX Corporation of Rockford, Ill. However, the electric-over-hydraulic power pack could be alternatively configured.

In using an electric-over-hydraulic power pack as part of an alternative power unit, the power pack could receive electric power from any of various electric power sources, such as a gas-powered generator, a panel of solar cells, one or more batteries, or a combination thereof.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A folding corral system operable to define an enclosed space and to selectively adjust the size of the enclosed space, said folding corral system comprising:
    a corral structure operable to be installed adjacent the enclosed space;
    a swingable corral panel pivotally supported relative to the corral structure to swing about an upright pivot axis,
    said swingable corral panel being swingable relative to the corral structure into and out of a deployed condition where the swingable corral panel at least partly defines the enclosed space;
    a powered drive system drivingly attached relative to the swingable corral panel,
    said powered drive system operable to drive the swingable corral panel into and out of the deployed condition;
    another swingable corral panel pivotally supported relative to the corral structure,
    said corral panels being shiftably attached to one another, with the corral panels cooperating to at least partly define the enclosed space in the deployed condition,
    said corral panels being pivotally attached to one another at a pivot joint spaced from the pivot axis to swing relative to each other about another upright pivot axis,
    each of said corral panels including a panel frame and a corral wheel rotatably mounted on the panel frame,
    said corral wheel spaced laterally from the respective pivot axis,
    each of the corral wheels swingably supporting the respective panel frame above the ground, with the corral wheels permitting the respective corral panels to be swung laterally along the ground,
    said powered drive system including a drive frame and a powered wheel rotatably mounted on the drive frame,
    said drive frame operable to be removably shiftably mounted relative either of the corral panels to selectively move the powered wheel into and out of frictional engagement with a corresponding one of the corral wheels; and
    a plurality of mounting brackets, with each mounting bracket fixed to a respective corral panel,
    said drive frame and said mounting bracket of each corral panel including complemental connectors that are selectively engageable with one another to pivotally mount the drive frame to the mounting brackets,
    said connectors being arranged to permit the powered drive system to pivot about a lateral axis when the connectors are engaged with one another.

2. The folding corral system as claimed in claim 1,
    said powered drive system including a motor and a rotating driven shaft powered by the motor,
    said motor being shiftably attached relative to the corral panel so that the corral panel at least partly supports the motor,
    said rotating driven shaft operable to drive the corral wheel when powered by the motor.

3. The folding corral system as claimed in claim 2,
    said powered wheel comprising a friction wheel mounted on the driven shaft to spin therewith, with the friction wheel thereby being drivingly powered by the motor,
    said friction wheel supported by the drive frame and movable therewith to selectively frictionally engage the corral wheel.

4. The folding corral system as claimed in claim 3,
    said motor comprising a hydraulic motor,
    said powered drive system including a hydraulic power unit in fluid communication with the hydraulic motor to selectively power the hydraulic motor and thereby drive the corral wheel.

5. The folding corral system as claimed in claim 1,
    said corral panels being folded alongside one another in a storage condition.

6. The folding corral system as claimed in claim 5,
    said another swingable corral panel being supported entirely by the first-mentioned swingable corral panel in the storage condition,
    said corral panels being swingable with each other in the storage condition, with the powered drive system operable to swing the corral panels at the same time.

7. The folding corral system as claimed in claim 1,
    said corral panels each having a respective pair of the mounting brackets fixed thereto, with the pair of mounting brackets located adjacent to corresponding lateral sides of the respective corral wheel.

8. The folding corral system as claimed in claim 1,
    said complemental connectors including a slotted structure and a pin element, respectively,
    said slotted structure presenting a slot that slidably receives the pin element and permits relative rotation between the tab element and the pin element about the lateral axis.

9. The folding corral system as claimed in claim 8,
    each of said mounting brackets including a respective slotted structure, with the drive frame including a corresponding pin element.

10. The folding corral system as claimed in claim 9,
    said slotted structures each including a body that presents the slot, with the slot having an uppermost open end,
    said slotted structures each including a finger shiftably mounted on the body, with the finger being shiftable into and out of a closed position where the finger restricts the corresponding pin element from moving into or out of the slot.

11. The folding corral system as claimed in claim 10,
    said corral panels each having a respective pair of the mounting brackets fixed thereto, with the pair of mounting brackets located adjacent to corresponding lateral sides of the respective corral wheel,
    said drive frame including a respective pair of pin elements, with each slot of the mounting brackets slidably receiving one of the pair of pin elements.

12. The folding corral system as claimed in claim 9,
    said slotted structure including a body that presents the slot, with the slot having an uppermost open end and a lowermost closed end,
    said slot extending along a slot axis between the ends, with the slot axis oriented at an oblique angle relative to an upright direction.

13. The folding corral system as claimed in claim 12,
    said corral panels each having a respective pair of the mounting brackets fixed thereto, with the pair of mounting brackets located adjacent to corresponding lateral sides of the respective corral wheel,
    said drive frame including a respective pair of pin elements, with each slot of the mounting brackets slidably receiving one of the pair of pin elements.

* * * * *